US012440823B2

(12) United States Patent
Heitsch et al.

(10) Patent No.: US 12,440,823 B2
(45) Date of Patent: Oct. 14, 2025

(54) POLYMER-BASED FILM WITH BALANCED PROPERTIES

(71) Applicant: Dow Global Technologies LLC, Midland, MI (US)

(72) Inventors: Andrew T. Heitsch, Angleton, TX (US); Yijian Lin, Pearland, TX (US); Barbara Bonavoglia, Zurich (CH); Kyle E. Hart, Manvel, TX (US); Mehmet Demirors, Pearland, TX (US); Rou Hua Chou, Singapore (SG); Manoj Thota, Ann Arbor, MI (US)

(73) Assignee: Dow Global Technologies LLC, Midland, MI (US)

( * ) Notice: Subject to any disclaimer, the term of this patent is extended or adjusted under 35 U.S.C. 154(b) by 707 days.

(21) Appl. No.: 17/295,264

(22) PCT Filed: Nov. 22, 2019

(86) PCT No.: PCT/US2019/062750
§ 371 (c)(1),
(2) Date: May 19, 2021

(87) PCT Pub. No.: WO2020/112526
PCT Pub. Date: Jun. 4, 2020

(65) Prior Publication Data
US 2022/0008893 A1    Jan. 13, 2022

Related U.S. Application Data

(60) Provisional application No. 62/773,468, filed on Nov. 30, 2018.

(51) Int. Cl.
| | |
|---|---|
| *B01J 20/26* | (2006.01) |
| *A61L 15/24* | (2006.01) |
| *B01J 20/28* | (2006.01) |
| *B01J 20/30* | (2006.01) |

(52) U.S. Cl.
CPC ............. *B01J 20/261* (2013.01); *A61L 15/24* (2013.01); *B01J 20/28033* (2013.01); *B01J 20/3064* (2013.01)

(58) Field of Classification Search
CPC .......... B01J 20/261; B01J 20/28033; B01J 20/3064; A61L 15/24; C08K 3/26; C08K 2003/265
See application file for complete search history.

(56) References Cited

U.S. PATENT DOCUMENTS

| | | |
|---|---|---|
| 3,338,992 A | 8/1967 | Kinney |
| 3,502,538 A | 3/1970 | Petersen |
| 3,502,763 A | 3/1970 | Hartmann |
| 3,645,992 A | 2/1972 | Elston |
| 3,849,241 A | 11/1974 | Butin et al. |
| 3,914,342 A | 10/1975 | Mitchell |
| 4,041,203 A | 8/1977 | Brock et al. |
| 4,076,698 A | 2/1978 | Anderson et al. |
| 4,314,912 A | 2/1982 | Lowery et al. |
| 4,340,563 A | 7/1982 | Appel et al. |
| 4,374,888 A | 2/1983 | Bomslaeger |
| 4,547,475 A | 10/1985 | Glass et al. |
| 4,599,392 A | 7/1986 | Mckinney et al. |
| 4,612,300 A | 9/1986 | Coleman |
| 5,169,706 A | 12/1992 | Collier, IV et al. |
| 5,272,236 A | 12/1993 | Lai et al. |
| 5,278,272 A | 1/1994 | Lai et al. |
| 5,292,845 A | 3/1994 | Kawasaki et al. |
| 5,582,923 A | 12/1996 | Kale et al. |
| 5,733,155 A | 3/1998 | Sagawa |
| 5,844,045 A | 12/1998 | Kolthammer et al. |
| 5,854,045 A | 12/1998 | Fang et al. |
| 5,869,575 A | 2/1999 | Kolthammer et al. |
| 5,977,251 A | 11/1999 | Kao et al. |
| 6,176,952 B1 | 1/2001 | Maugans et al. |
| 6,214,924 B1 * | 4/2001 | Bieser ................. C08L 23/0815 524/515 |
| 6,448,341 B1 | 9/2002 | Kolthammer et al. |
| 6,469,103 B1 * | 10/2002 | Jain ..................... C08L 23/0815 525/240 |
| 6,538,070 B1 | 3/2003 | Cardwell et al. |
| 6,545,088 B1 | 4/2003 | Kolthammer et al. |
| 6,566,446 B1 | 5/2003 | Parikh et al. |

(Continued)

FOREIGN PATENT DOCUMENTS

| | | |
|---|---|---|
| CN | 102257019 A | 11/2011 |
| EP | 1041090 A1 | 10/2000 |

(Continued)

OTHER PUBLICATIONS

JP Office Action dated Aug. 25, 2023, pertaining to JP Application No. 2020569798, 8 pgs.

(Continued)

*Primary Examiner* — Jane L Stanley
(74) *Attorney, Agent, or Firm* — Dinsmore & Shohl LLP

(57) ABSTRACT

A film includes 20.0 weight percent to 69.5 weight percent of a linear low density polyethylene (LLDPE) based polymer. The LLDPE having a high density fraction (HDF) from 3.0% to 8.0%, an $I_{10}/I_2$ ratio from 5.5 to 6.9, and a short chain branching distribution (SCBD) of less than or equal to 8.0° C. The film also includes 0.0 weight percent to 10.0 weight percent low density polyethylene (LDPE) based polymer, and 30.0 weight percent to 70.0 weight percent pore former.

18 Claims, 3 Drawing Sheets

(56) References Cited

U.S. PATENT DOCUMENTS

| | | |
|---|---|---|
| 6,812,289 B2 | 11/2004 | Van Dun et al. |
| 6,869,904 B2 | 3/2005 | Boussie et al. |
| 7,030,256 B2 | 4/2006 | Boussie et al. |
| 7,230,511 B2 | 6/2007 | Onishi et al. |
| 7,829,641 B2 | 11/2010 | Etherton et al. |
| 8,058,373 B2 | 11/2011 | Stevens et al. |
| 8,101,696 B2 | 1/2012 | Konze et al. |
| 8,829,115 B2 | 9/2014 | Hermel-Davidock et al. |
| 9,029,487 B2 | 5/2015 | Klosin et al. |
| 9,115,275 B2 | 8/2015 | Kupar et al. |
| 11,873,393 B2 | 1/2024 | Hart et al. |
| 2003/0130464 A1 | 7/2003 | Ho et al. |
| 2004/0158011 A1 | 8/2004 | Jain et al. |
| 2005/0043460 A1 | 2/2005 | Mccormack et al. |
| 2008/0287634 A1 | 11/2008 | Nieto et al. |
| 2009/0156764 A1* | 6/2009 | Malakoff ............ B29C 48/1472 526/170 |
| 2012/0238720 A1 | 9/2012 | Lam et al. |
| 2012/0277380 A1 | 11/2012 | Karjala et al. |
| 2013/0046061 A1 | 2/2013 | Hermel-Davidock |
| 2015/0259586 A1 | 9/2015 | Kapur et al. |
| 2017/0081444 A1 | 3/2017 | Wang et al. |
| 2017/0247485 A1 | 8/2017 | Morrison et al. |

FOREIGN PATENT DOCUMENTS

| | | |
|---|---|---|
| EP | 1656254 B1 | 2/2012 |
| EP | 3214115 A1 | 9/2017 |
| EP | 3312007 A1 | 4/2018 |
| EP | 3285706 A1 | 8/2019 |
| JP | 2009517497 A | 4/2009 |
| KR | 20180109075 A | 10/2018 |
| TW | 201321185 A | 6/2013 |
| WO | 199308221 A2 | 4/1993 |
| WO | 2005021262 A1 | 3/2005 |
| WO | 2008095807 A1 | 8/2008 |
| WO | 2014058639 A1 | 4/2014 |
| WO | 2016178768 A1 | 11/2016 |
| WO | 2017152065 A1 | 9/2017 |

OTHER PUBLICATIONS

Ex Parte Quayle dated Mar. 27, 2023, pertaining to U.S. Appl. No. 16/973,626, 8 pgs.
Taiwan Office Action dated Sep. 15, 2023, pertaining to TW Patent Application No. 108120638, 4 pgs.
US Notice of Allowance dated Oct. 4, 2023, pertaining to U.S. Appl. No. 16/973,639, 7 pgs.
US Notice of Allowance dated Oct. 4, 2023, pertaining to U.S. Appl. No. 16/973,649, 7 pgs.
US Notice of Allowance dated Nov. 3, 2023, pertaining to U.S. Appl. No. 16/973,610, 5 pgs.
Japanese Office Action dated Oct. 24, 2023, pertaining to JP Patent Application No. 2021-527039, 4 pgs.
Europe Examination Report dated Nov. 14, 2023, pertaining to EP Patent Application No. 19739449.7, 3 pgs.
International Search Report and Written Opinion pertaining to PCT/US2019/062750, dated Feb. 19, 2020.
Karjala et al., "Detection of Low Levels of Long-chain Branching in Polyolefins", Annual Technical Conference—Society of Plastics Engineers (2008), 66th 887-891.
Williams and Ward, J. Polym. Sci., Polym. Let., 6, 621 (1968).
Chinese Search Report dated Sep. 1, 2022 pertaining to Chinese patent application No. 201980044940.1 2 pages.
Chinese Office Action dated Sep. 1, 2022 pertaining to Chinese patent application No. 201980044940.1 2 pages.
Monraball et al., "Crystallization Elution Fractionations. A New Separation Process for Polyolefin Resins", Macromolecular Symposia, 2007, 71-79.
International Search Report and Written Opinion pertaining to PCT/US2019/036903, dated Oct. 4, 2019.
International Search Report and Written Opinion pertaining to PCT/US2019/036966, dated Oct. 24, 2019.
International Search Report and Written Opinion pertaining to PCT/US2019/036969, dated Sep. 11, 2019.
International Search Report and Written Opinion pertaining to PCT/US2019/036975, dated Sep. 11, 2019.
Randall, J.C., "A Review of High Resolution Liquid Carbon Nuclear Magnetic Resonance Characterizations of Ethylene-Based Polymers, Rev. Macromol. Chem. Phys., 201-317."
Communication pursuant to Rules 161(1) and 162 EPC, pertaining to Patent Application No. 19739449.7, dated Jan. 22, 2021.
Taiwan Search Report dated Nov. 16, 2022, pertaining to TW Patent Application No. 108120638, 4 pgs.
Chinese Office Action dated Jan. 20, 2023, pertaining to CN Patent Application No. 201980039875.3, 15 pgs.
Non-Final Office Action pertaining to U.S. Appl. No. 16/973,639, dated Feb. 7, 2023, 9 pages.
Non-Final Office Action pertaining to U.S. Appl. No. 16/973,649, dated Feb. 8, 2023, 7 pages.
Communication Pursuant to Article 94(3) EPC, dated Feb. 16, 2024, pertaining to EP Patent Application No. 19739753.2, 7 pgs.
Brazil Office Action dated Feb. 27, 2024, pertaining to BR Patent Application No. BR112020025383.9, 3 pgs.
Malaysia Office Action dated Nov. 29, 2023, pertaining to MY Patent Application No. PI20200006508, 4 pgs.
Brazil Office Action dated Nov. 6, 2023, pertaining to BR Patent Application No. BR112020025521.1, 8 pgs.
Brazil Office Action dated Sep. 24, 2024, pertaining to BR Patent Application No. BR112020025383.9, 5 pgs.
Mexican Office Action dated Sep. 27, 2024, pertaining to MX Patent Application No. MX/a/2020/013370, 16 pgs.
Korean Office Action dated Nov. 19, 2024, pertaining to KR Patent Application No. 10-2021-7019982, 7 pgs.
Canadian Examination and Search Report dated Jun. 12, 2025, pertaining to CA 3,103,013, 4 pgs.

* cited by examiner

POLYMER-BASED FILM WITH BALANCED PROPERTIES

CROSS-REFERENCE TO RELATED APPLICATIONS

This application is a National Stage Entry under 35 U.S.C. § 371 of International Patent Application No. PCT/US2019/062750, filed Nov. 22, 2019, which claims priority to U.S. Provisional Application Ser. No. 62/773,468 filed on Nov. 30, 2018, the entire disclosures of which are hereby incorporated by reference.

TECHNICAL FIELD

Embodiments of the present disclosure generally relate to breathable backsheets with balanced properties made from ethylene-based polymers having high density fractions.

BACKGROUND

Polymer-based films may be used in end products, such as, for example, as backsheets for use in products, such as, for example, diapers, hygienic pads, bandages, etc. Such films are generally made from a mixture of linear low density polyethylene (LLDPE), low density polyethylene (LDPE), and one or more fillers, such as, for example, calcium carbonate ($CaCO_3$). These polymer-based films are formulated with a focus on several properties that are indicative of the performance of the backsheets in which they may be incorporated. Among these properties are the water vapor transmission rate (WVTR), the hydrostatic pressure, the tear resistance, the noise and the secant modulus. It is difficult to form polymer-based films having a good balance of all these properties because when one of these properties is increased, one or more of these properties generally decrease.

SUMMARY

Therefore, as competition increases in the breathable backsheet industry, producers of ethylene-based polymers strive to make their products with broader ranges of properties, which in turn result in products, such as, for example, breathable backsheets, that have improved balance of properties. As such, ongoing needs exist for processes that are capable of producing ethylene-based polymers having a wider array of properties, such as, for example, high density fractions, so that these ethylene-based polymers may be used to provide an improved balance of properties in products, such as, for example, breathable backsheets. It has been found that by controlling the location of the catalyst inlet, such that it is upstream from a first reactor and downstream from a second reactor, reactions of components in the presence of the catalyst can better be controlled when forming an ethylene-based polymer. Further, because the catalyst is being combined with the components in a flow restricted area, compared to a bulk of a reactor, the catalyst and the components sufficiently mix before they reach the second reactor, and the second reactor can be non-agitated reactor, which reduces costs and energy consumption.

Accordingly, embodiments of the present disclosure are directed to breathable backsheets made with ethylene-based polymers.

Embodiments of the present disclosure are directed to a film comprising: 20.0 weight percent to 69.5 weight percent linear low density polyethylene (LLDPE) based polymer, wherein the LLDPE based polymer comprises a high density fraction (HDF) from 3.0% to 10.0%, wherein the high density fraction is measured by crystallization elution fractionation (CEF) integration at temperatures from 93° C. to 119° C., an $I_{10}/I_2$ ratio from 5.5 to 6.9, wherein $I_2$ is the melt index when measured according to ASTM D 1238 at a load of 2.16 kg and temperature of 190° C. and $I_{10}$ is the melt index when measured according to ASTM D 1238 at a load of 10 kg and temperature of 190° C., and a short chain branching distribution (SCBD) of less than or equal to 8.0° C., wherein the short chain branching distribution is measured by CEF full width at half height; 0.0 weight percent to 10.0 weight percent low density polyethylene (LDPE) based polymer; and 30.0 weight percent to 70.0 weight percent pore former.

Additional features and advantages will be set forth in the detailed description which follows, and in part will be readily apparent to those skilled in the art from that description or recognized by practicing the embodiments described herein, including the detailed description which follows, the claims, as well as the appended drawing.

It is to be understood that both the foregoing general description and the following detailed description describe various embodiments and are intended to provide an overview or framework for understanding the nature and character of the claimed subject matter. The accompanying drawing is included to provide a further understanding of the various embodiments, and is incorporated into and constitutes a part of this specification. The drawing illustrates the various embodiments described herein, and together with the description serve to explain the principles and operations of the claimed subject matter.

DETAILED DESCRIPTION

Figure 1:
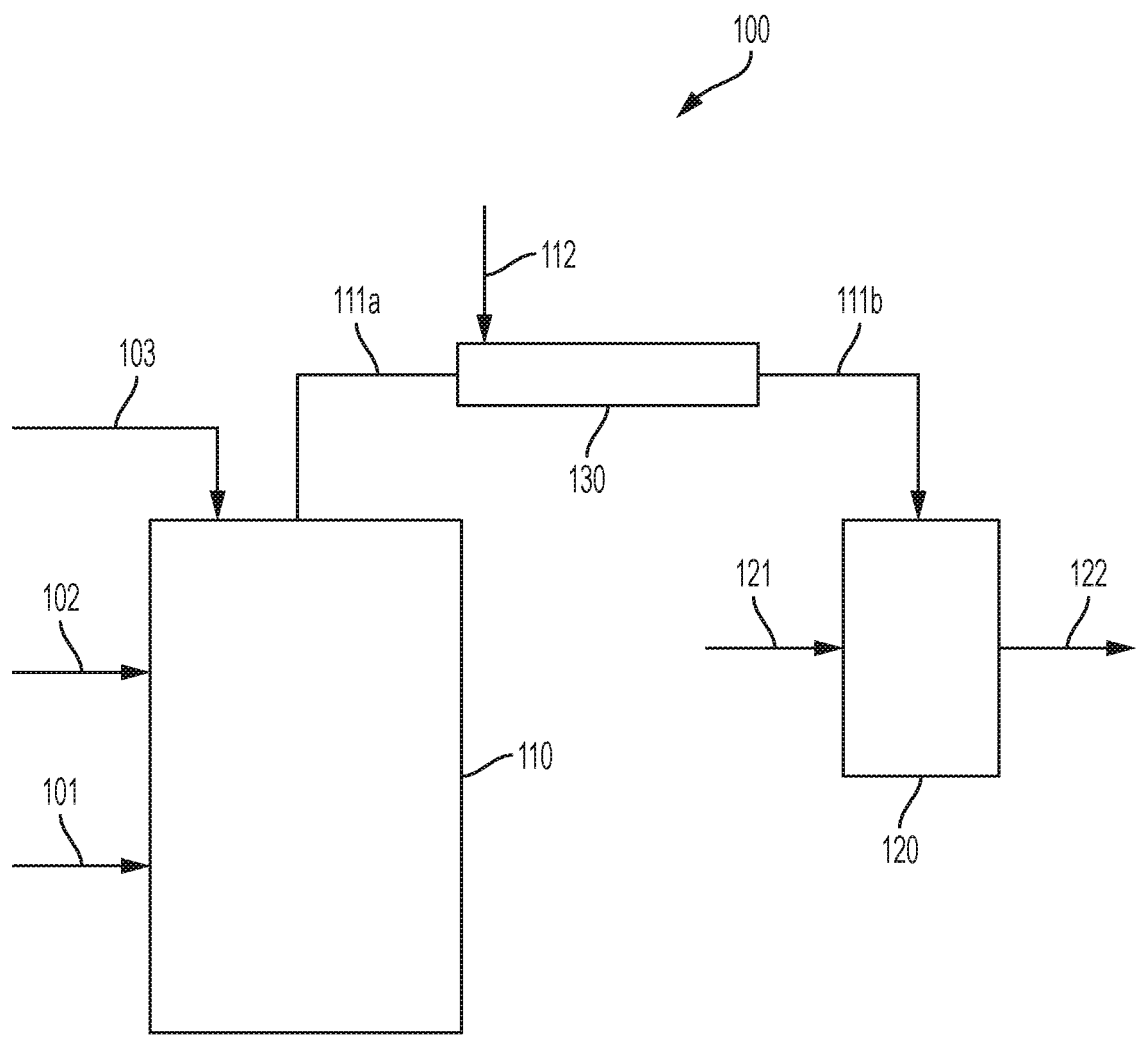
FIG. 1 schematically depicts a system for producing ethylene-based polymers having high density fractions according to embodiments disclosed and described herein.

Specific embodiments of the present application will now be described. The disclosure may, however, be embodied in different forms and should not be construed as limited to the embodiments set forth in this disclosure. Rather, these embodiments are provided so that this disclosure will be thorough and complete, and will fully convey the scope of the subject matter to those skilled in the art.

According to one embodiment, a film comprises: 20.0 weight percent to 69.5 weight percent linear low density polyethylene (LLDPE) based polymer, wherein the LLDPE based polymer comprises a high density fraction (HDF) from 3.0% to 10.0%, wherein the high density fraction is measured by crystallization elution fractionation (CEF) integration at temperatures from 93° C. to 119° C., an $I_{10}/I_2$ ratio from 5.5 to 6.9, wherein $I_2$ is the melt index when measured according to ASTM D 1238 at a load of 2.16 kg and temperature of 190° C. and $I_{10}$ is the melt index when measured according to ASTM D 1238 at a load of 10 kg and temperature of 190° C., and a short chain branching distribution (SCBD) of less than or equal to 8.0° C., wherein the short chain branching distribution is measured by CEF full width at half height; 0.0 weight percent to 10.0 weight percent low density polyethylene (LDPE) based polymer; and 30.0 weight percent to 70.0 weight percent pore former.

Definitions

The term "polymer" refers to a polymeric compound prepared by polymerizing monomers, whether of the same or a different type. The generic term polymer thus embraces the term "homopolymer," usually employed to refer to polymers prepared from only one type of monomer as well as "copolymer" which refers to polymers prepared from two or more different monomers. The term "interpolymer," as used herein, refers to a polymer prepared by the polymerization of at least two different types of monomers. The generic term interpolymer thus includes copolymers, and polymers prepared from more than two different types of monomers, such as terpolymers.

As used herein, the "solution polymerization reactor" is a vessel, which performs solution polymerization, wherein ethylene monomer and at least $C_3$-$C_{12}$ α-olefin comonomer copolymerize after being dissolved in a non-reactive solvent that contains a catalyst. In the solution polymerization process, hydrogen may be utilized; however, it is not required in all solution polymerization processes.

"Polyethylene" or "ethylene-based polymer" shall mean polymers comprising greater than 50% by mole of units derived from ethylene monomer. This includes ethylene-based homopolymers or copolymers (meaning units derived from two or more comonomers). Common forms of polyethylene known in the art include, but are not limited to, Low Density Polyethylene (LDPE); Linear Low Density Polyethylene (LLDPE); Ultra Low Density Polyethylene (ULDPE); Very Low Density Polyethylene (VLDPE); single-site catalyzed Linear Low Density Polyethylene, including both linear and substantially linear low density resins (m-LLDPE); Medium Density Polyethylene (MDPE); and High Density Polyethylene (HDPE).

The term "LDPE" may also be referred to as "high pressure ethylene polymer" or "highly branched polyethylene" and is defined to mean that the polymer is partly or entirely homopolymerized or copolymerized in autoclave or tubular reactors at pressures above 14,500 psi (100 MPa) with the use of free-radical initiators, such as peroxides (see, for example, U.S. Pat. No. 4,599,392, which is hereby incorporated by reference in its entirety). LDPE resins typically have a density in the range of 0.916 to 0.940 g/cm.

The term "LLDPE", includes resin made using Ziegler-Natta catalyst systems as well as resin made using single-site catalysts, including, but not limited to, bis-metallocene catalysts (sometimes referred to as "m-LLDPE"), phosphinimine, and constrained geometry catalysts; and resin made using post-metallocene, molecular catalysts, including, but not limited to, bis(biphenylphenoxy) catalysts (also referred to as polyvalent aryloxyether catalysts). LLDPE includes linear, substantially linear, or heterogeneous ethylene-based copolymers or homopolymers. LLDPEs contain less long chain branching than LDPEs and include the substantially linear ethylene polymers, which are further defined in U.S. Pat. Nos. 5,272,236; 5,278,272; 5,582,923; and 5,733,155; the homogeneously branched ethylene polymers such as those in U.S. Pat. No. 3,645,992; the heterogeneously branched ethylene polymers such as those prepared according to the process disclosed in U.S. Pat. No. 4,076,698; and blends thereof (such as those disclosed in U.S. Pat. No. 3,914,342 or 5,854,045). The LLDPE resins can be made via gas-phase, solution-phase or slurry polymerization or any combination thereof, using any type of reactor or reactor configuration known in the art.

The term "procatalyst" refers to a compound that has catalytic activity when combined with an activator. The term "activator" refers to a compound that chemically reacts with a procatalyst in a manner that converts the procatalyst to a catalytically active catalyst. As used herein, the terms "cocatalyst" and "activator" are interchangeable terms.

The term "non-agitated reactor" refers to a reactor that does not include mechanical agitation, such as agitation by a stirrer, a mixer, a kneader, or the like. Examples of non-agitated reactors include plug flow reactors, tank reactors, and loop reactors, all without stirrers, mixers, or the like.

The term "mixer" refers to an apparatus that mechanically mixes the components present in the apparatus. Examples of mixers include static mixers, flow shapers, and vessels comprising a stirrer, mixer, kneader, or the like. In embodiments, components present in the mixer—such as monomers, comonomer, etc.—will react in the mixer.

System Configuration

Reference will now be made in detail to systems for producing ethylene-based polymers having high density fractions according to embodiments disclosed and described herein.

With reference now to FIG. 1, a system 100 for producing ethylene-based polymer having a high density fraction according to embodiments comprises a first reactor 110 and a second reactor 120 fluidly connected to the first reactor 110. The type of reactors used for the first reactor 110 and the second reactor 120 are not limited and, in embodiments, are reactors suitable for use as solution polymerization reactors. In embodiments, the first reactor 110 is an agitated solution polymerization reactor, such as, for example a loop reactor, an isothermal reactor, an adiabatic reactor, and a continuous stirred tank reactor in parallel, series, and any combinations thereof. The second reactor 120, according to embodiments, is a non-agitated solution polymerization reactor, such as, for example, a non-agitated tank reactor or a tubular reactor (e.g., a plug flow reactor, a piston flow reactor, etc.).

According to embodiments, one or more mixers 130 are positioned downstream from a first reactor 110 and upstream from a second reactor 120. Although FIG. 1 only depicts one mixer, it should be understood that additional mixers may be positioned in series or parallel downstream from the first reactor 110 and upstream from the second reactor 120. The mixer 130 may be a flow shaper or static mixer. For example, in some embodiments, mixer 130 may comprise a flow shaper and a static mixer. A "flow shaper" as used herein may be any type of apparatus that alters the flow of a component stream, such as, for example, a tapered pipe, a diffuser, or a nozzle. In embodiments, such as the embodiment depicted in FIG. 1, the mixer 130 and the non-agitated rector 120 may be separate physical apparatuses. However, in some embodiments, the mixer 130 and the non-agitated reactor 120 may be a single physical apparatus with two distinct zones. As an example, in embodiments, the mixer 130 and non-agitated reactor 120 may both be housed in an elongated tube. In static mixer may be positioned in a first portion of the elongated tube, while a second portion of the elongated tube does not include the static mixer—or any other type of agitator. In such an embodiment, the first zone of the elongated tube where the static mixer is present is the mixer 130 and the second zone of the elongated tube where no agitator is present is the non-agitated reactor 120. In such an embodiment, the mixer 130 and the non-agitated reactor are housed in a single physical apparatus.

As shown in the embodiment depicted in FIG. 1, the first reactor 110 is configured to receive: feed stream 101 that comprises ethylene monomer and $C_3$-$C_{12}$ α-olefin comonomer in solvent; first catalyst stream 103; and, optionally, hydrogen ($H_2$) stream 102. The components of feed stream 101, first catalyst stream 103, and optional hydrogen stream 102 are reacted in the first reactor 110 to produce a first polymer fraction. This first polymer fraction is outputted from the first reactor 110 as effluent 111a. In embodiments, effluent 111a comprises unreacted ethylene monomer and unreacted $C_3$-$C_{12}$ α-olefin comonomer in addition to the first polymer fraction. It should be understood that, in some embodiments, the components of the feed stream 101 may be added to the first reactor 110 together or as separate streams. For example, ethylene monomer and solvent may be added to the first reactor as a separate stream from the $C_3$-$C_{12}$ α-olefin comonomer. The order at which the ethylene monomer, $C_3$-$C_{12}$ α-olefin comonomer, and solvent into the first reactor 110 is not limited.

With reference still to FIG. 1, second catalyst stream 112 is added to the effluent 111a downstream of the first reactor 110 (i.e., agitated solution polymerization reactor) and upstream from the second reactor 120 (i.e., non-agitated solution polymerization reactor). The second catalyst stream 112 may, in embodiments be added into the mixer 130. In other embodiments, the second catalyst stream 112 may be added immediately before the mixer 130. Second catalyst stream 112 comprises a different catalyst than the first catalyst stream 103 and facilitates reaction of unreacted ethylene monomer and unreacted $C_3$-$C_{12}$ α-olefin comonomer present in the effluent 111a to produce a second polymer fraction. In embodiments, the second polymer fraction has a density and melt index ($I_2$) that differ from the density and melt index ($I_2$) of the first polymer fraction. The modified effluent 111b, which comprises the first polymer fraction, the second polymer fraction, and second catalyst, is passed from the mixer 130 to the second reactor 120.

A second feed stream 121 comprising additional ethylene monomer, additional $C_3$-$C_{12}$ α-olefin comonomer, and solvent is passed to second reactor 120. The additional ethylene monomer and additional $C_3$-$C_{12}$ α-olefin comonomer from the second feed stream 121 react in the presence of the second catalyst introduced into the second reactor 120 via the modified effluent 111b to form additional second polymer fraction. Accordingly, an ethylene-based polymer, which comprises first polymer fraction and second polymer fraction is outputted from the second reactor 120 in product stream 122.

By introducing the second catalyst stream 112 downstream from the first reactor 110 and upstream from the second reactor 120, the second catalyst stream 112 mixes with unreacted ethylene monomer and unreacted $C_3$-$C_{12}$ α-olefin comonomer present in effluent 111a prior introduction of second catalyst into the second reactor 120. This circumvents a common issue that occurs when second catalyst is introduced directly into the second reactor 120; gumming of the second catalyst inlet that undesirably restricts the amount of second catalyst that is added to the second reactor 120. Accordingly, by provided the second catalyst stream 112 downstream from the first reactor 110 and upstream from the second reactor 120, agitation is not required in the second reactor 120, which can reduce equipment and operating costs. A mixer 130 mixes the second catalyst stream 112 with unreacted ethylene monomer and unreacted $C_3$-$C_{12}$ α-olefin comonomer present in effluent 111a prior to passing effluent 111a and the second catalyst stream 112 to the second reactor 120. The mixing of unreacted ethylene monomer and unreacted $C_3$-$C_{12}$ α-olefin comonomer in the mixer 130 in the presence of second catalyst allows for reactions of the unreacted ethylene monomer and unreacted $C_3$-$C_{12}$ α-olefin comonomer at low temperatures and high ethylene monomer concentrations, which results in a second polymer fraction with high density, portions to be formed in the mixer 130.

Additionally, in some embodiments, additional ethylene monomer may be added downstream from the first reactor 110 and upstream from the second reactor 120, such as, for example, into the mixer 130, to facilitate formation of the second polymer fraction before modified effluent 111b enters the second reactor 120. In some embodiments, the additional ethylene monomer may be added to effluent 111a (i.e., before the second catalyst stream 112 is introduced into the mixer 130), and in other embodiments, the additional ethylene monomer may be added to the mixer 130.

Methods and Components

Reference will now be made in detail to methods and components used in systems of embodiments disclosed above for producing ethylene-based polymers having high density fraction according to embodiments disclosed and described herein.

As disclosed previously herein, and with reference to FIG. 1, the first reactor 110, which is an agitated solution polymerization reactor, receives feed stream 101, first catalyst stream 103, and, optionally, hydrogen stream 102. The components of the feed stream 101—optionally with hydrogen from hydrogen stream 102—react in the presence of a first catalyst, which is introduced into the first reactor 110 via first catalyst stream 103, to form a first polymer fraction. The first polymer fraction and non-reacted components exit the first reactor 110 via effluent 111a. Each of these streams and the reaction conditions within the first reactor 110 are described in more detail below.

Feed stream 101 comprises ethylene monomer and $C_3$-$C_{12}$ α-olefin comonomer in solvent. In some embodiments, the comonomer is $C_3$-$C_8$ α-olefin. Exemplary α-olefin comonomers include, but are not limited to, propylene, 1-butene, 1-pentene, 1-hexene, 1-heptene, 1-octene, 1-nonene, 1-decene, and 4-methyl-1-pentene. The one or more α-olefin comonomers may, in embodiments, be selected from the group consisting of propylene, 1-butene, 1-hexene, and 1-octene. The solvent present in the feed stream may, in embodiments, be aromatic and paraffin solvents. In some embodiments, the solvent may be isoparaffins, such as, for example, ISOPAR E manufactured by ExxonMobil Chemical.

The hydrogen stream 102 is essentially pure hydrogen and, in embodiments, comprises greater than 97 volume percent (vol. %) hydrogen, such as greater than 98 vol. % hydrogen, or greater than 99 vol. % hydrogen.

The first catalyst is added to the first reactor 110 via first catalyst stream 103 and facilitates reactions between ethylene monomer, $C_3$-$C_{12}$ α-olefin comonomer, and, optionally, hydrogen. Catalysts that may be used in embodiments include, but are not limited to, a post-metallocene catalyst, a constrained geometry complex (CGC) catalyst, a phosphinimine catalyst, or a bis(biphenylphenoxy) catalyst. Details and examples of CGC catalysts are provided in U.S. Pat. Nos. 5,272,236; 5,278,272; 6,812,289; and WO Publication 93/08221, which are all incorporated herein by reference in their entirety. Details and examples of bis(biphenylphenoxy) catalysts are provided in U.S. Pat. Nos. 6,869, 904; 7,030,256; 8,101,696; 8,058,373; 9,029,487, which are all incorporated herein by reference in their entirety. In embodiments, the first catalyst may be a molecular catalyst including, but not limited to, bis(biphenylphenoxy) catalysts (also referred to as polyvalent aryloxyether catalysts).

Bis(biphenylphenoxy) catalysts are multi-component catalyst systems comprising a bis(biphenylphenoxy) procatalyst, a cocatalyst that activates the procatalyst, as well as other optional ingredients. In embodiments, the bis(biphenylphenoxy) procatalyst may include a metal-ligand complex according to Formula (I):

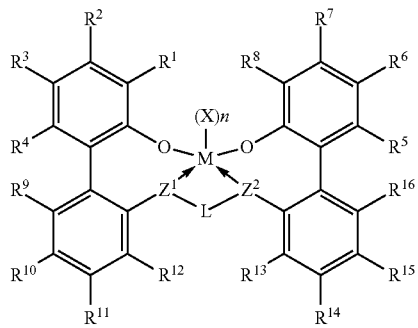

(I)

In Formula (I), M is a metal chosen from titanium, zirconium, or hafnium, the metal being in a formal oxidation state of +2, +3, or +4; n is 0, 1, or 2; when n is 1, X is a monodentate ligand or a bidentate ligand; when n is 2, each X is a monodentate ligand and is the same or different; the metal-ligand complex is overall charge-neutral; O is O (an oxygen atom); each Z is independently chosen from —O—, —S—, —N($R^N$)—, or —P($R^P$)—; L is ($C_1$-$C_{40}$)hydrocarbylene or ($C_1$-$C_{40}$)heterohydrocarbylene, wherein the ($C_1$-$C_{40}$)hydrocarbylene has a portion that comprises a 1-carbon atom to 10-carbon atom linker backbone linking the two Z groups in Formula (I) (to which L is bonded) or the ($C_1$-$C_{40}$)heterohydrocarbylene has a portion that comprises a 1-atom to 10-atom linker backbone linking the two Z groups in Formula (I), wherein each of the 1 to 10 atoms of the 1-atom to 10-atom linker backbone of the ($C_1$-$C_{40}$)heterohydrocarbylene independently is a carbon atom or heteroatom, wherein each heteroatom independently is O, S, S(O), S(O)$_2$, Si($R^C$)$_2$, Ge($R^C$)$_2$, P($R^C$), or N($R^C$), wherein independently each $R^C$ is ($C_1$-$C_{30}$)hydrocarbyl or ($C_1$-$C_{30}$)heterohydrocarbyl; $R^1$ and $R^8$ are independently selected from the group consisting of ($C_1$-$C_{40}$)hydrocarbyl, ($C_1$-$C_{40}$)heterohydrocarbyl, —Si($R^C$)$_3$, —Ge($R^C$)$_3$, —P($R^P$)$_2$, —N($R^N$)$_2$, —OR$^C$, —SR$^C$, —NO$_2$, —CN, —CF$_3$, $R^C$S(O)—, $R^C$S(O)$_2$—, ($R^C$)$_2$C=N—, $R^C$C(O)O—, $R^C$OC(O)—, $R^C$C(O)N($R^N$)—, ($R^N$)$_2$NC(O)—, halogen, and radicals having Formula (II), Formula (III), or Formula (IV):

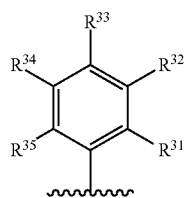

(II)

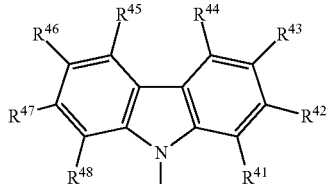

(III)

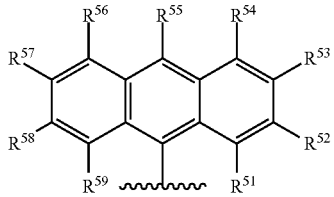

(IV)

In Formulas (II), (III), and (IV), each of $R^{31-35}$, $R^{41-48}$, or $R^{51-59}$ is independently chosen from ($C_1$-$C_{40}$)hydrocarbyl, ($C_1$-$C_{40}$)heterohydrocarbyl, —Si($R^C$)$_3$, —Ge($R^C$)$_3$, —P($R^P$)$_2$, —N($R^N$)$_2$, —OR$^C$, —SR$^C$, —NO$_2$, —CN, —CF$_3$, $R^C$S(O)—, $R^C$S(O)$_2$—, ($R^C$)$_2$C=N—, $R^C$C(O)O—, $R^C$OC(O)—, $R^C$C(O)N($R^N$)—, ($R^N$)$_2$NC(O)—, halogen, or —H, provided at least one of $R^1$ or $R^8$ is a radical having Formula (II), Formula (III), or Formula (IV).

In Formula (I), each of $R^{2-4}$, $R^{5-7}$, and $R^{9-16}$ is independently selected from ($C_1$-$C_{40}$)hydrocarbyl, ($C_1$-$C_{40}$)heterohydrocarbyl, —Si($R^C$)$_3$, —Ge($R^C$)$_3$, —P($R^P$)$_2$, —N($R^N$)$_2$—OR$^C$, —SR$^C$, —NO$_2$, —CN, —CF$_3$, $R^C$S(O)—, $R^C$S(O)$_2$—, ($R^C$)$_2$C=N, $R^C$C(O)O—, $R^C$OC(O)—, $R^C$C(O)N($R^N$)—, ($R^C$)$_2$NC(O)—, halogen, and —H.

Detailed embodiments of various functional groups that can be present in the compositions depicted in Formulae (I)-(IV) will now be described in detail. It should be understood that the following functional groups are exemplary and are disclosed to provide non-limiting examples of the bis(biphenylphenoxy) procatalyst that can be used according to embodiments.

"Independently selected" as used herein indicates that the R groups, such as, $R^1$, $R^2$, $R^3$, $R^4$, and $R^5$ can be identical or different (e.g., $R^1$, $R^2$, $R^3$, $R^4$, and $R^5$ may all be substituted alkyls or $R^1$ and $R^2$ may be a substituted alkyl and $R^3$ may be an aryl, etc.). Use of the singular includes use of the plural and vice versa (e.g., a hexane solvent, includes hexanes). A named R group will generally have the structure that is recognized in the art as corresponding to R groups having that name. These definitions are intended to supplement and illustrate, not preclude, the definitions known to those of skill in the art.

When used to describe certain carbon atom-containing chemical groups, a parenthetical expression having the form "($C_x$-$C_y$)" or a non-parenthetical expression having the form "$C_x$-$C_y$," means that the unsubstituted form of the chemical group has from x carbon atoms to y carbon atoms, inclusive of x and y. For example, a ($C_1$-$C_{40}$)alkyl is an alkyl group having from 1 to 40 carbon atoms in its unsubstituted form. In some embodiments and general structures, certain chemical groups may be substituted by one or more substituents such as $R^S$. An $R^S$ substituted version of a chemical group defined using the "($C_x$-$C_y$)" parenthetical or "$C_x$-$C_y$" non-parenthetical may contain more than y carbon atoms depending on the identity of any groups $R^{1-5}$. For example, a "($C_1$-$C_{40}$)alkyl substituted with exactly one group $R^S$, where $R^S$ is phenyl (—$C_6H_5$)" may contain from 7 to 46 carbon atoms. Thus, in general when a chemical group defined using the "$(C_x-C_y)$" parenthetical $C_x-C_y$ non-parenthetical is substituted by one or more carbon atom-containing substituents $R^S$, the minimum and maximum total number of carbon atoms of the chemical group is determined by adding to both x and y the combined sum of the number of carbon atoms from all of the carbon atom-containing substituents $R^S$.

In some embodiments, each of the chemical groups (e.g., X, R, etc.) of the metal-ligand complex of Formula (I) may be unsubstituted having no $R^S$ substituents. In other embodiments, at least one of the chemical groups of the metal-ligand complex of Formula (I) may independently contain one or more than one $R^S$. In some embodiments, the sum total of $R^S$ in the chemical groups of the metal-ligand complex of Formula (I) does not exceed 20. In other embodiments, the sum total of $R^S$ in the chemical groups does not exceed 10. For example, if each $R^{1-5}$ was substituted with two $R^S$, then X and Z cannot be substituted with an $R^S$. In another embodiment, the sum total of $R^S$ in the chemical groups of the metal-ligand complex of Formula (I) may not exceed 5 $R^S$. When two or more than two $R^S$ are bonded to a same chemical group of the metal-ligand complex of Formula (I), each $R^S$ is independently bonded to the same or different carbon atom or heteroatom and may include persubstitution of the chemical group.

"Substitution" as used herein means that at least one hydrogen atom (—H) bonded to a carbon atom or heteroatom of a corresponding unsubstituted compound or functional group is replaced by a substituent (e.g., $R^S$). The term "persubstitution" as used herein means that every hydrogen atom (H) bonded to a carbon atom or heteroatom of a corresponding unsubstituted compound or functional group is replaced by a substituent (e.g., $R^S$). The term "polysubstitution" as used herein means that at least two, but fewer than all, hydrogen atoms bonded to carbon atoms or heteroatoms of a corresponding unsubstituted compound or functional group are replaced by a substituent.

As used herein, "—H" means a hydrogen or hydrogen radical that is covalently bonded to another atom. "Hydrogen" and "—H" are interchangeable, and unless clearly specified mean the same thing.

"$(C_1-C_{40})$hydrocarbyl" as used herein means a hydrocarbon radical of from 1 to 40 carbon atoms and the term "$(C_1-C_{40})$hydrocarbylene" means a hydrocarbon diradical of from 1 to 40 carbon atoms, in which each hydrocarbon radical and each hydrocarbon diradical is aromatic or non-aromatic, saturated or unsaturated, straight chain or branched chain, cyclic (including mono- and poly-cyclic, fused and non-fused polycyclic, including bicyclic; 3 carbon atoms or more) or acyclic and is unsubstituted or substituted by one or more $R^S$.

As used in this disclosure, a $(C_1-C_{40})$hydrocarbyl can be an unsubstituted or substituted $(C_1-C_{40})$alkyl, $(C_3-C_{40})$cycloalkyl, $(C_3-C_{20})$cycloalkyl-$(C_1-C_{20})$alkylene, $(C_6-C_{40})$aryl, or $(C_6-C_{20})$aryl-$(C_1-C_{20})$alkylene. In some embodiments, each of the aforementioned $(C_1-C_{40})$hydrocarbyl groups has a maximum of 20 carbon atoms (i.e., $(C_1-C_{20})$ hydrocarbyl) and other embodiments, a maximum of 12 carbon atoms.

"$(C_1-C_{40})$alkyl" and "$(C_1-C_{18})$alkyl" as used herein mean a saturated straight or branched hydrocarbon radical of from 1 to 40 carbon atoms or from 1 to 18 carbon atoms, respectively, which is unsubstituted or substituted by one or more $R^S$. Examples of unsubstituted $(C_1-C_{40})$alkyl are unsubstituted $(C_1-C_{20})$alkyl; unsubstituted $(C_1-C_{10})$alkyl; unsubstituted $(C_1-C_5)$alkyl; methyl; ethyl; 1-propyl; 2-propyl; 1-butyl; 2-butyl; 2-methylpropyl; 1,1-dimethylethyl; 1-pentyl; 1-hexyl; 1-heptyl; 1-nonyl; and 1-decyl. Examples of substituted $(C_1-C_{40})$alkyl are substituted $(C_1-C_{20})$alkyl, substituted $(C_1-C_{10})$alkyl, trifluoromethyl, and $[C_{45}]$alkyl. The term "$[C_{45}]$alkyl" (with square brackets) as used herein means there is a maximum of 45 carbon atoms in the radical, including substituents, and is, for example, a $(C_{27}-C_{40})$alkyl substituted by one $R^S$, which is a $(C_1-C_5)$alkyl, respectively. Each $(C_1-C_5)$alkyl may be methyl, trifluoromethyl, ethyl, 1-propyl, 1-methylethyl, or 1,1-dimethyl ethyl.

"$(C_6-C_{40})$aryl" as used herein means an unsubstituted or substituted (by one or more $R^S$) mono-, bi- or tricyclic aromatic hydrocarbon radical of from 6 to 40 carbon atoms, of which at least from 6 to 14 of the carbon atoms are aromatic ring carbon atoms, and the mono-, bi- or tricyclic radical comprises 1, 2, or 3 rings, respectively; wherein the 1 ring is aromatic and the 2 or 3 rings independently are fused or non-fused and at least one of the 2 or 3 rings is aromatic. Examples of unsubstituted $(C_6-C_{40})$aryl are unsubstituted $(C_6-C_{20})$aryl unsubstituted $(C_6-C_{18})$aryl; 2-$(C_1-C_5)$alkyl-phenyl; 2,4-bis$(C_1-C_5)$alkyl-phenyl; phenyl; fluorenyl; tetrahydrofluorenyl; indacenyl; hexahydroindacenyl; indenyl; dihydroindenyl; naphthyl; tetrahydronaphthyl; and phenanthrene. Examples of substituted $(C_6-C_{40})$aryl are substituted $(C_1-C_{20})$aryl; substituted $(C_6-C_{18})$aryl; 2,4-bis [$(C_{20})$alkyl]-phenyl; polyfluorophenyl; pentafluorophenyl; and fluoren-9-one-1-yl.

"$(C_3-C_{40})$cycloalkyl" as used herein means a saturated cyclic hydrocarbon radical of from 3 to 40 carbon atoms that is unsubstituted or substituted by one or more $R^S$. Other cycloalkyl groups (e.g., $(C_x-C_y)$cycloalkyl) are defined in an analogous manner as having from x to y carbon atoms and being either unsubstituted or substituted with one or more $R^S$. Examples of unsubstituted $(C_3-C_{40})$cycloalkyl are unsubstituted $(C_3-C_{20})$cycloalkyl, unsubstituted $(C_3-C_{10})$cycloalkyl, cyclopropyl, cyclobutyl, cyclopentyl, cyclohexyl, cycloheptyl, cyclooctyl, cyclononyl, and cyclodecyl. Examples of substituted $(C_3-C_{40})$cycloalkyl are substituted $(C_3-C_{20})$cycloalkyl, substituted $(C_3-C_{10})$cycloalkyl, cyclopentanon-2-yl, and 1-fluorocyclohexyl.

Examples of $(C_1-C_{40})$hydrocarbylene include unsubstituted or substituted $(C_6-C_{40})$arylene, $(C_3-C_{40})$cycloalkylene, and $(C_1-C_{40})$alkylene (e.g., $(C_1-C_{20})$alkylene). In some embodiments, the diradicals are on the same carbon atom (e.g., —CH$_2$—) or on adjacent carbon atoms (i.e., 1,2-diradicals), or are spaced apart by one, two, or more than two intervening carbon atoms (e.g., respective 1,3-diradicals, 1,4-diradicals, etc.). Some diradicals include α,ω-diradical. The α,ω-diradical is a diradical that has maximum carbon backbone spacing between the radical carbons. Some examples of $(C_2-C_{20})$alkylene α,ω-diradicals include ethan-1,2-diyl (i.e., —CH$_2$CH$_2$), propan-1,3-diyl (i.e., —CH$_2$CH$_2$CH$_2$—), 2-methylpropan-1,3-diyl (i.e., —CH$_2$CH(CH$_3$)CH$_2$—). Some examples of $(C_6-C_{40})$ arylene α,ω-diradicals include phenyl-1,4-diyl, napthalen-2,6-diyl, or napthalen-3,7-diyl.

"$(C_1-C_{40})$alkylene" as used herein means a saturated straight chain or branched chain diradical (i.e., the radicals are not on ring atoms) of from 1 to 40 carbon atoms that is unsubstituted or substituted by one or more $R^S$. Examples of unsubstituted $(C_1-C_{40})$alkylene are unsubstituted $(C_1-C_{20})$ alkylene, including unsubstituted-CH$_2$CH$_2$—, —(CH$_2$)$_3$—, —(CH$_2$)$_4$—, —(CH$_2$)$_5$—, —(CH$_2$)$_6$—, —(CH$_2$)$_7$—, —(CH$_2$)$_8$—, —CH$_2$C*HCH$_3$, and —(CH$_2$)$_4$C*(H)(CH$_3$), in which "C*" denotes a carbon atom from which a hydrogen atom is removed to form a secondary or tertiary alkyl radical. Examples of substituted $(C_1-C_{40})$alkylene are substituted $(C_1-C_{20})$alkylene, —CF$_2$—, —C(O)—, and —$(CH_2)_{14}C(CH_3)_2(CH_2)_5$— (i.e., a 6,6-dimethyl substituted normal-1,20-eicosylene). Since as mentioned previously two $R^S$ may be taken together to form a $(C_1-C_{18})$ alkylene, examples of substituted $(C_1-C_{40})$alkylene also include 1,2-bis(methylene)cyclopentane, 1,2-bis(methylene)cyclohexane, 2,3-bis(methylene)-7,7-dimethyl-bicyclo [2.2.1]heptane, and 2,3-bis(methylene)bicyclo [2.2.2] octene.

"$(C_3-C_{40})$cycloalkylene" as used herein means a cyclic diradical (i.e., the radicals are on ring atoms) of from 3 to 40 carbon atoms that is unsubstituted or substituted by one or more $R^S$.

"Heteroatom" as used herein refers to an atom other than hydrogen or carbon. Examples of groups containing one or more than one heteroatom include O, S, S(O), $S(O)_2$, $Si(R^C)_2$, $P(R^P)$, $N(R^N)$, —N=$C(R^C)_2$, —$Ge(R^C)_2$—, or —$Si(R^C)$—, where each $R^C$ and each $R^P$ is unsubstituted $(C_1-C_{18})$hydrocarbyl or —H, and where each $R^N$ is unsubstituted $(C_1-C_{18})$hydrocarbyl. The term "heterohydrocarbon" refers to a molecule or molecular framework in which one or more carbon atoms are replaced with a heteroatom. The term "$(C_1-C_{40})$heterohydrocarbyl" means a heterohydrocarbon radical of from 1 to 40 carbon atoms, and the term "$(C_1-C_{40})$heterohydrocarbylene" means a heterohydrocarbon diradical of from 1 to 40 carbon atoms, and each heterohydrocarbon has one or more heteroatoms. The radical of the heterohydrocarbyl is on a carbon atom or a heteroatom, and diradicals of the heterohydrocarbyl may be on: (1) one or two carbon atom, (2) one or two heteroatoms, or (3) a carbon atom and a heteroatom. Each $(C_1-C_{40})$ heterohydrocarbyl and $(C_1-C_{40})$heterohydrocarbylene may be unsubstituted or substituted (by one or more $R^S$), aromatic or non-aromatic, saturated or unsaturated, straight chain or branched chain, cyclic (including mono- and polycyclic, fused and non-fused polycyclic), or acyclic.

The $(C_1-C_{40})$heterohydrocarbyl may be unsubstituted or substituted. Non-limiting examples of the $(C_1-C_{40})$heterohydrocarbyl include $(C_1-C_{40})$heteroalkyl, $(C_1-C_{40})$hydrocarbyl-O—, $(C_1-C_{40})$hydrocarbyl-S—, $(C_1-C_{40})$hydrocarbyl-S (O)—, $(C_1-C_{40})$hydrocarbyl-$S(O)_2$—, $(C_1-C_{40})$hydrocarbyl-$Si(R^C)_2$—, $(C_1-C_{40})$hydrocarbyl-$N(R^N)$—, $(C_{40})$ hydrocarbyl-$P(R^P)$—, $(C_2-C_{40})$heterocyclo alkyl, $(C_2-C_{19})$ heterocycloalkyl-$(C_1-C_{20})$alkylene, $(C_3-C_{20})$cycloalkyl-$(C_1-C_{19})$heterocycloalkyl-$(C_2-C_{19})$heterocyclo alkyl-$(C_1-C_{20})$heteroalkylene, $(C_1-C_{50})$heteroaryl, $(C_1-C_{19})$heteroaryl-$(C_1-C_{20})$alkylene, $(C_6-C_{20})$aryl-$(C_1-C_{19})$heteroalkylene, or $(C_1-C_{19})$heteroaryl-$(C_1-C_{20})$heteroalkylene.

"$(C_1-C_{40})$heteroaryl" as used herein means an unsubstituted or substituted (by one or more $R^S$) mono-, bi- or tricyclic heteroaromatic hydrocarbon radical of from 1 to 40 total carbon atoms and from 1 to 10 heteroatoms, and the mono-, bi- or tricyclic radical comprises 1, 2 or 3 rings, respectively, wherein the 2 or 3 rings independently are fused or non-fused and at least one of the 2 or 3 rings is heteroaromatic. Other heteroaryl groups (e.g., $(C_x-C_y)$heteroaryl generally, such as $(C_1-C_{12})$heteroaryl) are defined in an analogous manner as having from x to y carbon atoms (such as 1 to 12 carbon atoms) and being unsubstituted or substituted by one or more than one $R^S$. The monocyclic heteroaromatic hydrocarbon radical is a 5-membered or 6-membered ring. The 5-membered ring has 5 minus h carbon atoms, wherein h is the number of heteroatoms and may be 1, 2, or 3; and each heteroatom may be O, S, N, or P. Examples of 5-membered ring heteroaromatic hydrocarbon radical are pyrrol-1-yl; pyrrol-2-yl; furan-3-yl; thiophen-2-yl; pyrazol-1-yl; isoxazol-2-yl; isothiazol-5-yl; imidazol-2-yl; oxazol-4-yl; thiazol-2-yl; 1,2,4-triazol-1-yl; 1,3, 4-oxadiazol-2-yl; 1,3,4-thiadiazol-2-yl; tetrazol-1-yl; tetrazol-2-yl; and tetrazol-5-yl. The 6-membered ring has 6 minus h carbon atoms, wherein h is the number of heteroatoms and may be 1 or 2 and the heteroatoms may be N or P. Examples of 6-membered ring heteroaromatic hydrocarbon radical are pyridine-2-yl; pyrimidin-2-yl; and pyrazin-2-yl. The bicyclic heteroaromatic hydrocarbon radical can be a fused 5,6- or 6,6-ring system. Examples of the fused 5,6-ring system bicyclic heteroaromatic hydrocarbon radical are indol-1-yl; and benzimidazole-1-yl. Examples of the fused 6,6-ring system bicyclic heteroaromatic hydrocarbon radical are quinolin-2-yl; and isoquinolin-1-yl. The tricyclic heteroaromatic hydrocarbon radical can be a fused 5,6,5-; 5,6,6-; 6,5,6-; or 6,6,6-ring system. An example of the fused 5,6,5-ring system is 1,7-dihydropyrrolo[3,2-f]indol-1-yl. An example of the fused 5,6,6-ring system is 1H-benzo[f]indol-1-yl. An example of the fused 6,5,6-ring system is 9H-carbazol-9-yl. An example of the fused 6,6,6-ring system is acrydin-9-yl.

The aforementioned heteroalkyl may be saturated straight or branched chain radicals containing $(C_1-C_{40})$ carbon atoms, or fewer carbon atoms and one or more of the heteroatoms. Likewise, the heteroalkylene may be saturated straight or branched chain diradicals containing from 1 to 50 carbon atoms and one or more than one heteroatoms. The heteroatoms, as defined above, may include $Si(R^C)_3$, Ge $(R^C)_3$, $Si(R^C)_2$, $Ge(R^C)_2$, $P(R^P)_2$, $P(R^P)$, $N(R^N)_2$, $N(R^N)$, N, O, $OR^C$, S, $SR^C$, S(O), and $S(O)_2$, wherein each of the heteroalkyl and heteroalkylene groups are unsubstituted or substituted by one or more $R^S$.

Examples of unsubstituted $(C_2-C_{40})$heterocycloalkyl are unsubstituted $(C_2-C_{20})$heterocycloalkyl, unsubstituted $(C_2-C_{10})$heterocycloalkyl, aziridin-1-yl, oxetan-2-yl, tetrahydrofuran-3-yl, pyrrolidin-1-yl, tetrahydrothiophen-S,S-dioxide-2-yl, morpholin-4-yl, 1,4-dioxan-2-yl, hexahydroazepin-4-yl, 3-oxa-cyclooctyl, 5-thio-cyclononyl, and 2-aza-cyclodecyl.

"Halogen atom" or "halogen" as used herein mean the radical of a fluorine atom (F), chlorine atom (Cl), bromine atom (Br), or iodine atom (I). The term "halide" means anionic form of the halogen atom: fluoride ($F^-$), chloride ($Cl^-$), bromide ($Br^-$), or iodide ($I^-$).

"Saturated" as used herein means lacking carbon-carbon double bonds, carbon-carbon triple bonds, and (in heteroatom-containing groups) carbon-nitrogen, carbon-phosphorous, and carbon-silicon double bonds. Where a saturated chemical group is substituted by one or more substituents $R^S$, one or more double and/or triple bonds optionally may or may not be present in substituents $R^S$. The term "unsaturated" means containing one or more carbon-carbon double bonds, carbon-carbon triple bonds, and (in heteroatom-containing groups) carbon-nitrogen, carbon-phosphorous, and carbon-silicon double bonds, not including any such double bonds that may be present in substituents $R^S$, if any, or in (hetero) aromatic rings, if any.

As noted above, the first catalyst may, in embodiments, comprise a procatalyst—such as, for example, the bis(biphenylphenoxy) procatalyst described above—and one or more cocatalysts that activate the procatalyst. Suitable activating cocatalysts for use according to embodiments include alkyl aluminums; polymeric or oligomeric alumoxanes (also known as aluminoxanes); neutral or strong Lewis acids; and non-polymeric, non-coordinating, ion-forming compounds (including the use of such compounds under oxidizing conditions). Exemplary suitable cocatalysts include, but are not limited to: modified methyl aluminoxane (MMAO), bis(hydrogenated tallow alkyl)methyl tetrakis(pentafluorophenyeborate(1⁻) amine, triethylaluminum (TEA), and combinations thereof. A suitable activating technique is bulk electrolysis. Combinations of one or more of the foregoing activating cocatalysts and techniques are also contemplated. The term "alkyl aluminum" as used herein means a monoalkyl aluminum dihydride or monoalkylaluminum dihalide, a dialkyl aluminum hydride or dialkyl aluminum halide, or a trialkylaluminum. Examples of polymeric or oligomeric alumoxanes include methylalumoxane, triisobutylaluminum-modified methylalumoxane, and isobutylalumoxane.

Lewis acid activators (cocatalysts) according to embodiments include Group 13 metal compounds containing from 1 to 3 ($C_1$-$C_{20}$)hydrocarbyl substituents as described herein. In embodiments, Group 13 metal compounds are tri(($C_1$-$C_{20}$)hydrocarbyl)-substituted-aluminum or tri(($C_1$-$C_{20}$)hydrocarbyl)-boron compounds. In other embodiments, Group 13 metal compounds are tri(hydrocarbyl)-substituted-aluminum, tri(hydrocarbyl)-boron compounds, tri(($C_1$-$C_{10}$)alkyealuminum, tri(($C_6$-$C_{18}$)aryl)boron compounds, and halogenated (including perhalogenated) derivatives thereof. In further embodiments, Group 13 metal compounds are tris (fluoro-substituted phenyl)boranes, tris(pentafluorophenyl) borane. In some embodiments, the activating cocatalyst is a tetrakis(($C_1$-$C_{20}$)hydrocarbyl borate (e.g. trityl tetrafluoroborate) or a tri(($C_1$-$C_{20}$)hydrocarbyl)ammonium tetra (($C_1$-$C_{20}$)hydrocarbyl)borane (e.g. bis(octadecyl)methylammonium tetrakis(pentafluorophenyl)borane). As used herein, the term "ammonium" means a nitrogen cation that is a (($C_1$-$C_{20}$)hydrocarbyl)$_4$N$^+$ a (($C_1$-$C_{20}$)hydrocarbyl)$_3$N(H)$^+$, a (($C_1$-$C_{20}$)hydrocarbyl)$_2$N(H)$_2^+$, ($C_1$-$C_{20}$)hydrocarbylN(H)$_3^+$, or N(H)$_4^+$, wherein each ($C_1$-$C_{20}$)hydrocarbyl, when two or more are present, may be the same or different.

Combinations of neutral Lewis acid activators (cocatalysts) as described herein include mixtures comprising a combination of a tri(($C_1$-$C_4$)alkyealuminum and a halogenated tri(($C_6$-$C_{18}$)aryl)boron compound, especially a tris (pentafluorophenyl)borane. Other embodiments are combinations of such neutral Lewis acid mixtures with a polymeric or oligomeric alumoxane, and combinations of a single neutral Lewis acid, especially tris(pentafluorophenyl) borane with a polymeric or oligomeric alumoxane. Ratios of numbers of moles of (metal-ligand complex):(tris(pentafluoro-phenylborane):(alumoxane) [e.g., (Group 4 metal-ligand complex):(tris(pentafluoro-phenylborane):(alumoxane)] are from 1:1:1 to 1:10:30, in other embodiments, from 1:1:1.5 to 1:5:10.

In embodiments, a ratio of total number of moles of one or more metal-ligand complexes of Formula (I) to total number of moles of one or more of the activating cocatalysts is from 1:10,000 to 100:1. In some embodiments, the ratio is at least 1:5000, in some other embodiments, at least 1:1000; and 10:1 or less, and in some other embodiments, 1:1 or less. When an alumoxane alone is used as the activating cocatalyst, in some embodiments the number of moles of the alumoxane that are employed is at least 100 times the number of moles of the metal-ligand complex of Formula (I). When tris(pentafluorophenyl)borane alone is used as the activating cocatalyst, in some other embodiments, the number of moles of the tris(pentafluorophenyl) borane that are employed to the total number of moles of one or more metal-ligand complexes of Formula (I) from 0.5:1 to 10:1, from 1:1 to 6:1, or from 1:1 to 5:1. The remaining activating cocatalysts are generally employed in approximately mole quantities equal to the total mole quantities of one or more metal-ligand complexes of Formula (I).

The reaction conditions in the first reactor 110 for reacting ethylene monomer, $C_3$-$C_{12}$ α-olefin comonomer, and, optionally, hydrogen in the presence of the first catalyst—embodiments of which are provided above—will now be described.

To facilitate the reaction of ethylene monomer with $C_3$-$C_{12}$ α-olefin comonomer in the presence of the first catalyst, in embodiments the first reactor 110 is heated to a temperature from 155° C. to 190° C., such as from 160° C. to 190° C., from 165° C. to 190° C., from 170° C. to 190° C., from 175° C. to 190° C., from 180° C. to 190° C., or from 185° C. to 190° C. In embodiments, the first reactor is heated to a temperature from 155° C. to 185° C., such as from 155° C. to 180° C., from 155° C. to 175° C., from 155° C. to 170° C., from 155° C. to 165° C., or from 155° C. to 160° C. It should be understood that the above temperature ranges include the endpoints recited therein (e.g., "from 155° C. to 190° C." includes both 155° C. and 190° C.) and the temperature of the first reactor 110 may be measured with any conventional reactor temperature monitoring systems and software.

The feed stream 101 that is introduced in to the first reactor 110, in embodiments, comprises a high concentration of ethylene monomer. In some embodiments, the feed stream 101 comprises from 70 grams per liter (g/L) to 135 g/L ethylene monomer. In some embodiments, the feed stream 101 comprises from 75 g/L to 135 g/L ethylene monomer, such as from 80 g/L to 135 g/L ethylene monomer, from 85 g/L to 135 g/L ethylene monomer, from 90 g/L to 135 g/L ethylene monomer, from 95 g/L to 135 g/L ethylene monomer, from 100 g/L to 135 g/L ethylene monomer, from 105 g/L to 135 g/L ethylene monomer, from 110 g/L to 135 g/L ethylene monomer, from 115 g/L to 135 g/L ethylene monomer, from 120 g/L to 135 g/L ethylene monomer, from 125 g/L to 135 g/L ethylene monomer, or from 130 g/L to 135 g/L ethylene monomer. In other embodiments, the feed stream 101 comprises from 70 g/L to 130 g/L ethylene monomer, such as from 70 g/L to 125 g/L ethylene monomer, from 70 g/L to 120 g/L ethylene monomer, from 70 g/L to 115 g/L ethylene monomer, from 70 g/L to 110 g/L ethylene monomer, from 70 g/L to 105 g/L ethylene monomer, from 70 g/L to 100 g/L ethylene monomer, from 70 g/L to 95 g/L ethylene monomer, from 70 g/L to 90 g/L ethylene monomer, from 70 g/L to 85 g/L ethylene monomer, from 70 g/L to 80 g/L ethylene monomer, or from 70 g/L to 75 g/L ethylene monomer.

The concentration of comonomer in the feed stream 101 is not limited and can be present in a concentration from 0.0 g/L to 95.0 g/L, such as from 5.0 g/L to 95.0 g/L, from 15.0 g/L to 95.0 g/L, from 25.0 g/L to 95.0 g/L, from 35.0 g/L to 95.0 g/L, from 45.0 g/L to 95.0 g/L, from 55.0 g/L to 95.0 g/L, from 65.0 g/L to 95.0 g/L, from 75.0 g/L to 95.0 g/L, or from 85.0 g/L to 95.0 g/L. In some embodiments, the concentration of comonomer in the feed stream 101 is from 0.0 g/L to 90.0 g/L, from 0.0 g/L to 80.0 g/L, from 0.0 g/L to 70.0 g/L, from 0.0 g/L to 60.0 g/L, from 0.0 g/L to 50.0 g/L, from 0.0 g/L to 40.0 g/L, from 0.0 g/L to 30.0 g/L, from 0.0 g/L to 20.0 g/L, or from 0.0 g/L to 10.0 g/L.

In embodiments, the first catalyst is present in the first reactor 110 at a concentration from 0.06 micromole per liter (μmol/L) to 3.00 μmon, such as from 0.500 μmon to 3.00 μmon, from 1.00 μmon to 3.00 μmon, from 1.50 μmon to 3.00 μmon, from 2.00 μmon to 3.00 μmon, or from 2.50 μmon to 3.00 μmon. In embodiments, the first catalyst is present in the first reactor 110 at a concentration from 0.06 μmon to 2.50 μmon, such as from 0.06 μmon to 2.00 μmon, from 0.06 μmon to 1.50 μmon, from 0.06 μmon to 1.00 μmon, from 0.06 μmon to 0.500 μmon, from 0.06 μmon to 0.250 μmon, or from 0.06 μmon to 0.100 μmon.

Under these reaction conditions, ethylene monomer, $C_3$-$C_{12}$ α-olefin comonomer, and, optionally, hydrogen react in the presence of the first catalyst, such as, for example, the catalysts described above, to form the first polymer fraction. In embodiments, this first polymer fraction is lower in density and lower in melt index ($I_2$) than the second polymer fraction formed in the mixer 130.

As described previously in this disclosure, at least the first polymer fraction, unreacted ethylene monomer, and unreacted $C_3$-$C_{12}$ α-olefin comonomer exit the first reactor 110 in effluent 111a. A second catalyst is introduced to the effluent 111a via second catalyst stream 112 causing the unreacted ethylene monomer and unreacted $C_3$-$C_{12}$ α-olefin comonomer to react in the presence of the second catalyst and form a second polymer fraction. The high concentration of ethylene monomer present in both the feed stream 101 and the effluent 111a ensures there is sufficient ethylene present when the second catalyst stream 112 is introduced to the effluent 111a at mixer 130 to allow for formation of the second polymer fraction.

In embodiments, the effluent 111a comprises from 20 grams per liter (g/L) to 45 g/L ethylene monomer. In some embodiments, the effluent 111a comprises from 25 g/L to 45 g/L ethylene monomer, such as from 30 g/L to 45 g/L ethylene monomer, from 35 g/L to 45 g/L ethylene monomer, or from 40 g/L to 45 g/L ethylene monomer. In other embodiments, effluent 111a comprises from 20 g/L to 40 g/L ethylene monomer, such as from 20 g/L to 35 g/L ethylene monomer, from 20 g/L to 30 g/L ethylene monomer, or from 20 g/L to 25 g/L ethylene monomer.

As the modified effluent 111b—comprising ethylene monomer, $C_3$-$C_{12}$ α-olefin comonomer, second catalyst, and second polymer fraction—travels through the mixer 130 toward the second reactor 120, the ethylene monomer and $C_3$-$C_{12}$ α-olefin comonomer present in the modified effluent 111b continue to react in the presence of the second catalyst to form second polymer fraction. It should be understood that the temperature where the second catalyst stream 112 is introduced to the effluent 111a is approximately equal to the temperature within the first reactor 110 (i.e., from 155° C. to 190° C.), which is lower than the temperature in the second reactor. Further, although ethylene monomer is reacted in the first reactor 110 to form the first polymer fraction, the amount of ethylene introduced into the first reactor 110 is such that the concentration of unreacted ethylene monomer in the effluent 111a is sufficient to form second polymer fraction. In some embodiments, additional, fresh ethylene monomer may be added to either the effluent 111a (i.e., before the second catalyst stream 112 is introduced to the effluent) or to the modified effluent 111b (i.e., after the second catalyst stream 112 is introduced to the effluent). In embodiments, reactions of ethylene monomer and $C_3$-$C_{12}$ α-olefin comonomer in the presence of the second catalyst occur in the mixer 130. Reacting ethylene monomer and $C_3$-$C_{12}$ α-olefin comonomer in the presence of the second catalyst before the modified effluent 111b is introduced into the second reactor 120 produces a second polymer fraction that has a high density fraction, which in turn results in a ethylene-based polymer with better balance of density and melt index. Without being bound by any particular theory, it is believed that the relatively low temperature of the modified effluent 111b and the high concentration of ethylene monomer in the modified effluent 111b results in increased propagation rates, such as, for example, propagation rates 2 to 4 times higher than propagation rates achieved in conventional processes where a second catalyst is added at the second reactor and at higher temperatures. It is believed that the increased propagation rate provides a high density fraction in the ethylene-based polymer.

The second catalyst that is introduced to the effluent 111a via the second catalyst stream 112 is, in embodiments, a Ziegler-Natta catalyst or a second molecular catalyst—which were described in detail above. In embodiments, exemplary Ziegler-Natta catalysts are those derived from (1) organomagnesium compounds, (2) alkyl halides or aluminum halides or hydrogen chloride, and (3) a transition metal compound. Examples of such catalysts are described in U.S. Pat. No. 4,314,912 (Lowery, Jr. et al.), U.S. Pat. No. 4,547,475 (Glass et al.), and U.S. Pat. No. 4,612,300 (Coleman, III), the teachings of which are incorporated herein by reference in their entirety. The Ziegler-Natta procatalyst may be formed by (a) reacting a hydrocarbon-soluble organomagnesium compound or complex thereof and an active non-metallic or metallic halide to form a halogenated magnesium support; b) contacting the magnesium halide support with a conditioning compound containing an element selected from the group consisting of boron, aluminum, gallium, indium and tellurium under conditions sufficient to form a conditioned magnesium halide support; (c) contacting the magnesium halide support and a compound containing, as a first metal, titanium, to form a supported titanium compound; and (d) optionally, contacting the supported titanium compound and a second metal and optionally a third metal independently selected from the transition metal series, provided that the second metal and the third metal are not the same; and further provided that the molar ratio of the magnesium to a combination of the titanium and the second and third metals ranges from 30:1 to 5:1; all under conditions sufficient to form a procatalyst.

Particularly suitable organomagnesium compounds for use in Ziegler-Natta catalysts include, for example, hydrocarbon soluble dihydrocarbylmagnesium such as the magnesium dialkyls and the magnesium diaryls. Exemplary suitable magnesium dialkyls include particularly n-butyl-secbutylmagnesium, diisopropylmagnesium, di-n-hexylmagnesium, isopropyl-n-butyl-magnesium, ethyl-n-hexylmagnesium, ethyl-n-butylmagnesium, di-n-octylmagnesium and others wherein the alkyl has from 1 to 20 carbon atoms. Exemplary suitable magnesium diaryls include diphenylmagnesium, dibenzylmagnesium and ditolylmagnesium. Suitable organomagnesium compounds include alkyl and aryl magnesium alkoxides and aryloxides and aryl and alkyl magnesium halides. In some embodiments, the organomagnesium compound is a halogen-free organomagnesium.

The modified effluent 111b—which comprises unreacted methylene, unreacted $C_3$-$C_{12}$ α-olefin comonomer, second catalyst, first polymer fraction, and second polymer fraction—is present in the mixer 130 for a duration from 3 minutes to 6 minutes, such as from 3 minutes to 5 minutes, or from 3 minutes to 4 minutes before it is introduced into the second reactor 120.

After the modified effluent 111b is introduced into the second reactor 120, which is a non-agitated solution polymerization reactor, the modified effluent 111b is heated to a temperature that is greater than the temperature in the first reactor 110 and greater than the temperature of the modified effluent 111b in the mixer 130. In embodiments, the temperature within the second reactor 120 is from 190° C. to 265° C. The temperature within the second reactor 120 is, in some embodiments, from 195° C. to 265° C., such as from 200° C. to 265° C., from 205° C. to 265° C., from 210° C. to 265° C., from 215° C. to 265° C., from 220° C. to 265° C., from 225° C. to 265° C., from 230° C. to 265° C., from 235° C. to 265° C., from 240° C. to 265° C., from 240° C.

to 265° C., from 245° C. to 265° C., from 250° C. to 265° C., or from 255° C. to 265° C. In other embodiments, the temperature within the second reactor is from 190° C. to 260° C., such as from 190° C. to 255° C., from 190° C. to 250° C., from 190° C. to 245° C., from 190° C. to 240° C., from 190° C. to 235° C., from 190° C. to 230° C., from 190° C. to 225° C., from 190° C. to 220° C., from 190° C. to 215° C., from 190° C. to 210° C., from 190° C. to 205° C., from 190° C. to 200° C., or from 190° C. to 195° C. It should be understood that the above temperature ranges include the endpoints recited therein (e.g., "from 190° C. to 265° C." includes both 190° C. and 265° C.) and the temperature of the second reactor 120 may be measured with any conventional reactor temperature monitoring systems and software.

The unreacted ethylene monomer and unreacted $C_3$-$C_{12}$ α-olefin comonomer in the modified effluent 111b that enters the second reactor 120 will react in the presence of the second catalyst to form additional second polymer fraction. In addition, a second feed stream 121 that comprises ethylene monomer and $C_3$-$C_{12}$ α-olefin comonomer in solvent is introduced into the second reactor 120. The ethylene monomer and $C_3$-$C_{12}$ α-olefin comonomer from the second feed stream 121 will also react in the presence of the second catalyst to form additional second polymer fraction. It should be understood that although FIG. 1 depicts second feed stream 121 as a single feed stream, the components may be individually introduced into the second reactor 120.

After a sufficient amount of time in the second reactor 120, product stream 122 that comprises an ethylene-based polymer exits the second reactor 120. Properties of the ethylene-based polymer present in product stream 122 will be described in more detail below. Although not shown in FIG. 1, it should be understood that any unreacted ethylene monomer, unreacted $C_3$-$C_{12}$ α-olefin comonomer, and solvent present in product stream 122 may be separated from the ethylene-based polymer and recycled back to the system 100 or 200 in feed stream 101 to the first reactor 110 or in second feed stream 121 to the second reactor 120.

The over conversion rate of ethylene monomer in the system 100 is from 90% to 94%, such as from 91% to 94%, from 92% to 94%, or from 93% to 94%.

Ethylene-Based Polymer Properties

Exemplary properties of ethylene-based polymers produced according to embodiments disclosed and described herein will now be provided. As noted above, and without being bound to any particular theory, it is believed that the combination of the exemplary properties listed below is made possible by the processes and systems disclosed and described hereinabove.

According to embodiments, the ethylene-based polymer may have a density from 0.900 to 0.925 g/cc measured according to ASTM D792. In some embodiments, the ethylene-based polymer has a density from 0.910 g/cc to 0.925 g/cc, such as from 0.915 g/cc to 0.925 g/cc, or from 0.920 g/cc to 0.925 g/cc. In other embodiments the ethylene-based polymer has a density from 0.910 g/cc to 0.920 g/cc, such as from 0.910 g/cc to 0.915 g/cc. In yet other embodiments, the ethylene-based polymer has a density from 0.912 g/cc to 0.920 g/cc, or from 0.910 g/cc to 0.918 g/cc. It should be understood that the above density ranges include the endpoints recited therein.

The ethylene-based polymers of embodiments have a high density fraction (HDF)—measured by crystallization elution fractionation (CEF) integration at temperatures from 93° C. to 119° C.—from 3.0% to 10.0%, such as from 3.5% to 10.0%, from 4.0% to 10.0%, from 5.5% to 10.0%, from 6.0% to 10.0%, from 6.5% to 10.0%, from 7.0% to 10.0%, from 7.5% to 10.0%, from 8.0% to 10.0%, from 8.5% to 10.0%, from 9.0% to 10.0%, or from 9.5% to 10.0. In other embodiments, the ethylene-based polymers of embodiments have an HDF from 3.0% to 9.5%, such as from 3.0% to 9.0%, from 3.0% to 8.5%, from 3.0% to 8.0%, from 3.0% to 7.5%, from 3.0% to 7.0%, from 3.0% to 6.5%, from 3.0% to 6.0%, from 3.0% to 5.5%, from 3.0% to 5.0%, from 3.0% to 4.5%, or from 3.0% to 4.0%. In still other embodiments the ethylene-based polymers of embodiments have an HDF from 3.5% to 9.5%, such as from 4.0% to 9.0%, from 4.5% to 8.5%, from 5.0% to 8.0%, from 5.5% to 7.5%, or from 6.0% to 7.0. It should be understood that the above HDF ranges include the endpoints recited therein.

In embodiments, the ethylene-based polymer has a melt index ($I_2$)—measured according to ASTM D 1238 at a load of 2.16 kg—from 1.0 grams per 10 minutes (g/10 mins) to 6.0 g/10 mins, such as from 1.5 g/10 mins to 6.0 g/10 mins, from 2.0 g/10 mins to 6.0 g/10 mins, from 2.5 g/10 mins to 6.0 g/10 mins, from 3.0 g/10 mins to 6.0 g/10 mins, from 3.5 g/10 mins to 6.0 g/10 mins, from 4.0 g/10 mins to 6.0 g/10 mins, from 4.5 g/10 mins to 6.0 g/10 mins, from 5.0 g/10 mins to 6.0 g/10 mins, or from 5.5 g/10 mins to 6.0 g/10 mins. In other embodiments, the ethylene-based polymer has an I2 from 1.0 g/10 mins to 5.5 g/10 mins, such as 1.0 g/10 mins to 5.5 g/10 mins, from 1.0 g/10 mins to 4.5 g/10 mins, from 1.0 g/10 mins to 4.0 g/10 mins, from 1.0 g/10 mins to 3.5 g/10 mins, from 1.0 g/10 mins to 3.0 g/10 mins, from 1.0 g/10 mins to 2.5 g/10 mins, from 1.0 g/10 mins to 2.0 g/10 mins, or from 1.0 g/10 mins to 1.5 g/10 mins. In yet other embodiments, the ethylene-based polymer has an I2 from 1.0 g/10 mins to 4.5 g/10 mins, such as from 1.5 g/10 mins to 4.0 g/10 mins, from 2.0 g/10 mins to 4.0 g/10 mins, from 3.0 g/10 mins to 4.0 g/10 mins, or from 3.0 g/10 mins to 3.5 g/10 mins. It should be understood that the above 12 ranges include the endpoints recited therein.

The ethylene-based polymer may have an $I_{10}/I_2$ ratio—where $I_2$ is the melt index when measured according to ASTM D 1238 at a load of 2.16 kg and temperature of 190° C. and $I_{10}$ is the melt index when measured according to ASTM D 1238 at a load of 10 kg and temperature of 190° C.—from 5.5 to 6.9, such as from 5.7 to 6.9, from 5.9 to 6.9, from 6.0 to 6.9, from 6.2 to 6.9, from 6.4 to 6.9, from 6.6 to 6.9, or from 6.8 to 6.9. In other embodiments, ethylene-based polymer may have an $I_{10}/I_2$ ratio from 5.5 to 6.8, such as from 5.5 to 6.6, from 5.5 to 6.4, from 5.5 to 6.2, from 5.5 to 6.0, from 5.5 to 5.8, or from 5.5 to 5.6. In still other embodiments, the ethylene-based polymer may have an $I_{10}/I_2$ ratio from 5.6 to 6.8, such as from 5.7 to 6.7, from 5.8 to 6.6, from 5.9 to 6.5, from 6.0 to 6.4, or from 6.1 to 6.3. In still other embodiments, the ethylene-based polymer may have an $I_{10}/I_2$ ratio from 5.5 to 6.5. It should be understood that the above $I_{10}/I_2$ ratio ranges include the endpoints recited therein.

The short chain branching distribution (SCBD) of ethylene-based polymers is, according to embodiments, less than 10° C.—measured by CEF full width at half height. In some embodiments, the SCBD of ethylene-based polymers is less than 8.0° C., such as less than 7.5° C., less than 7.0° C., less than 6.5° C., less than 6.0° C., less than 5.0° C. It should be understood that the above SCBD ranges include the endpoints recited therein.

The ethylene-based polymer has, according to embodiments, a zero shear viscosity ratio (ZSVR) from 1.1 to 3.0, such as from 1.2 to 3.0, from 1.3 to 3.0, from 1.4 to 3.0, from 1.5 to 3.0, from 1.6 to 3.0, from 1.7 to 3.0, from 1.8 to 3.0, from 1.9 to 3.0, from 2.0 to 3.0, from 2.1 to 3.0, from 2.2 to 3.0, from 2.3 to 3.0, from 2.4 to 3.0, from 2.5 to 3.0, from 2.6 to 3.0, from 2.7 to 3.0, from 2.8 to 3.0, or from 2.9 to 3.0. In some embodiments, the ethylene-based polymer has a zero shear viscosity ration from 1.1 to 2.9, from 1.1 to 2.8, from 1.1 to 2.7, from 1.1 to 2.6, from 1.1 to 2.5, from 1.1 to 2.4, such as from 1.1 to 2.3, from 1.1 to 2.2, from 1.1 to 2.2, from 1.1 to 2.1, from 1.1 to 2.0, from 1.1 to 1.9, from 1.1 to 1.8, from 1.1 to 1.7, from 1.1 to 1.6, from 1.1 to 1.5, from 1.1 to 1.4, from 1.1 to 1.3, or from 1.1 to 1.2. In still other embodiments, the ethylene-based polymer has a zero shear viscosity ratio from 1.2 to 2.9, such as from 1.3 to 2.8, from 1.4 to 2.7, from 1.5 to 2.6, from 1.6 to 2.5, from 1.7 to 2.4, from 1.8 to 2.3, from 1.9 to 2.2, or from 2.0 to 2.1. It should be understood that the above zero shear viscosity ratio ranges include the endpoints recited therein.

An ethylene-based polymer, according to embodiments, comprises from 70.0 weight percent (wt. %) to 95.0 wt. % of the first polymer fraction and from 8.0 wt. % to 30.0 wt. % of the second polymer fraction. In some embodiments, the ethylene-based polymer comprises from 72.0 wt. % to 95.0 wt. % of the first polymer fraction, such as from 74.0 wt. % to 95.0 wt. % of the first polymer fraction, from 76.0 wt. % to 95.0 wt. % of the first polymer fraction, from 78.0 wt. % to 95.0 wt. % of the first polymer fraction, from 80.0 wt. % to 95.0 wt. % of the first polymer fraction, from 82.0 wt. % to 95.0 wt. % of the first polymer fraction, from 84.0 wt. % to 95.0 wt. % of the first polymer fraction, from 86.0 wt. % to 95.0 wt. % of the first polymer fraction, from 88.0 wt. % to 95.0 wt. % of the first polymer fraction, or from 90.0 wt. % to 95.0 wt. % of the first polymer fraction. In other embodiments, the ethylene-based polymer comprises from 70.0 wt. % to 92.0 wt. % of the first polymer fraction, such as from 70.0 wt. % to 90.0 wt. % of the first polymer fraction, from 70.0 wt. % to 88.0 wt. % of the first polymer fraction, from 70.0 wt. % to 86.0 wt. % of the first polymer fraction, from 70.0 wt. % to 84.0 wt. % of the first polymer fraction, from 70.0 wt. % to 82.0 wt. % of the first polymer fraction, from 70.0 wt. % to 80.0 wt. % of the first polymer fraction, from 70.0 wt. % to 78.0 wt. % of the first polymer fraction, from 70.0 wt. % to 76.0 wt. % of the first polymer fraction, from 70.0 wt. % to 74.0 wt. % of the first polymer fraction, or from 70.0 wt. % to 72.0 wt. % of the first polymer fraction. In still other embodiments, the ethylene-based polymer comprises from 72.0 wt. % to 92.0 wt. % of the first polymer fraction, such as from 74.0 wt. % to 90.0 wt. % of the first polymer fraction, from 76.0 wt. % to 88.0 wt. % of the first polymer fraction, from 78.0 wt. % to 86.0 wt. % of the first polymer fraction, or from 80.0 wt. % to 84.0 wt. % of the first polymer fraction. It should be understood that the above weight percent ranges include the endpoints recited therein.

In some embodiments, the ethylene-based polymer comprises from 5.0 wt. % to 30.0 wt. % of the second polymer fraction, such as from 8.0 wt. % to 30.0 wt. % of the second polymer fraction, from 10.0 wt. % to 30.0 wt. % of the second polymer fraction, from 12.0 wt. % to 30.0 wt. % of the second polymer fraction, from 14.0 wt. % to 30.0 wt. % of the second polymer fraction, from 16.0 wt. % to 30.0 wt. % of the second polymer fraction, from 18.0 wt. % to 30.0 wt. % of the second polymer fraction, from 20.0 wt. % to 30.0 wt. % of the second polymer fraction, from 22.0 wt. % to 30.0 wt. % of the second polymer fraction, from 24.0 wt. % to 30.0 wt. % of the second polymer fraction, from 26.0 wt. % to 30.0 wt. % of the second polymer fraction, or from 28.0 wt. % to 30.0 wt. % of the second polymer fraction. In other embodiments, the ethylene-based polymer comprises from 5.0 wt. % to 28.0 wt. % of the second polymer fraction, such as from 5.0 wt. % to 26.0 wt. % of the second polymer fraction, from 5.0 wt. % to 24.0 wt. % of the second polymer fraction, from 5.0 wt. % to 22.0 wt. % of the second polymer fraction, from 5.0 wt. % to 20.0 wt. % of the second polymer fraction, from 5.0 wt. % to 18.0 wt. % of the second polymer fraction, from 5.0 wt. % to 16.0 wt. % of the second polymer fraction, from 5.0 wt. % to 14.0 wt. % of the second polymer fraction, from 5.0 wt. % to 12.0 wt. % of the second polymer fraction, from 5.0 wt. % to 10.0 wt. % of the second polymer fraction, or from 5.0 wt. % to 8.0 wt. % of the second polymer fraction. In still other embodiments, the ethylene-based polymer comprises from 5.0 wt. % to 28.0 wt. % of the second polymer fraction, from 6.0 wt. % to 26.0 wt. % of the second polymer fraction, from 8.0 wt. % to 24.0 wt. % of the second polymer fraction, from 10.0 wt. % to 22.0 wt. % of the second polymer fraction, from 12.0 wt. % to 20.0 wt. % of the second polymer fraction, or from 14.0 wt. % to 18.0 wt. % of the second polymer fraction. It should be understood that the above weight percent ranges include the endpoints recited therein.

The amount of each polymer fraction in the ethylene-based polymer may be adjusted based on the application or use. For example, a different balance of properties may be desirable in low temperature applications (e.g., below 0° C.) versus applications where the ethylene-based polymer is subjected to higher temperatures (e.g., temperatures greater than 40° C.).

In embodiments, the melt index and density of the second polymer fraction consists of the polymer fraction formed in the mixer 130 and the reaction environment of the second reactor 120. The polymer fraction made in the mixer 130 has a lower melt index (MI), and the polymer fraction formed in the second reactor 120 has higher MI (e.g., about 4 times higher than polymer fraction formed in the mixer 130). The combined second polymer fraction formed in the mixer 130 and the second reactor 120 has a high density fraction that is greater than the density of the first ethylene-based polymer fraction by at least 0.03 g/cc, such as greater than the density by at least 0.04 g/cc as shown by the CEF peak temperatures. In addition, using processes for forming an ethylene-based polymer according to embodiments disclosed and described herein, the final ethylene-based polymer (i.e., including the first polymer fraction and the second polymer fraction) has a higher density and higher melt index ($I_2$) than the first polymer fraction. Also, the portion of the second polymer fraction formed in the mixer has a higher molecular weight than the portion of the second polymer fraction formed in the second, non-agitated reactor.

In some processes, processing aids, such as plasticizers, can also be included in the ethylene-based polymer product. These aids include, but are not limited to, the phthalates, such as dioctyl phthalate and diisobutyl phthalate, natural oils such as lanolin, and paraffin, naphthenic and aromatic oils obtained from petroleum refining, and liquid resins from rosin or petroleum feedstocks. Exemplary classes of oils useful as processing aids include white mineral oil such as KAYDOL oil (Chemtura Corp.; Middlebury, Conn.) and SHELLFLEX 371 naphthenic oil (Shell Lubricants; Houston, Tex.). Another suitable oil is TUFFLO oil (Lyondell Lubricants; Houston, Tex.).

In some processes, ethylene-based polymer compositions are treated with one or more stabilizers, for example, antioxidants, such as IRGANOX 1010 and IRGAFOS168 (Ciba Specialty Chemicals; Glattbrugg, Switzerland). In general, polymers are treated with one or more stabilizers before an extrusion or other melt processes. In other embodiment processes, other polymeric additives include, but are not limited to, ultraviolet light absorbers, antistatic agents, pigments, dyes, nucleating agents, fillers, slip agents, fire retardants, plasticizers, processing aids, lubricants, stabilizers, smoke inhibitors, viscosity control agents and anti-blocking agents. The ethylene-based polymer composition may, for example, comprise less than 10 percent by the combined weight of one or more additives, based on the weight of the ethylene-based polymer composition.

In some embodiments, one or more antioxidants may further be added into the ethylene-based polymer compositions and/or the compounded polymer. The ethylene-based polymer composition may contain any amount of one or more antioxidants. For example, the ethylene-based polymer compositions may comprise from 200 to 600 parts of one or more phenolic antioxidants per one million parts of the ethylene-based polymer compositions. In addition, the ethylene-based polymer composition may comprise from 800 to 1200 parts of a phosphite-based antioxidant per one million parts of ethylene-based polymer compositions.

Additives and adjuvants may be added to the ethylene-based polymer compositions post-formation. Suitable additives include fillers, such as organic or inorganic particles, including clays, talc, titanium dioxide, zeolites, powdered metals, organic or inorganic fibers, including carbon fibers, silicon nitride fibers, steel wire or mesh, and nylon or polyester cording, nano-sized particles, clays, and so forth; tackifiers, oil extenders, including paraffinic or napthelenic oils; and other natural and synthetic polymers, including other polymers that are or can be made according to the embodiment methods.

Film Composition and Properties

In embodiments, polymer-based films may be formed with compositions comprising ethylene-based polymers disclosed and described herein. In some embodiments, films may be made from a composition comprising LLDPE according to embodiments disclosed and described herein (e.g., LLDPE having one or more of the HDF, $I_{10}/I_2$ ratio, SCBD, etc. disclosed herein), LDPE, and a pore former. In one or more embodiments, polymer-based films comprise from 20.0 weight percent (wt %) to 69.5 wt % LLDPE according to embodiments disclosed and described herein, from 0.5 wt % to 10.0 wt % LDPE, and from 30.0 wt % to 70.0 wt % pore former. It should be understood that the above weight percent ranges include the endpoints recited therein.

In embodiments, films may comprise from 20.0 wt % to 69.5 wt % LLDPE according to embodiments disclosed and described herein, such as from 25.0 wt % to 69.5 wt %, from 30.0 wt % to 69.5 wt %, from 35.0 wt % to 69.5 wt %, from 40.0 wt % to 69.5 wt %, from 45.0 wt % to 69.5 wt %, from 50.0 wt % to 69.5 wt %, from 55.0 wt % to 69.5 wt %, from 60.0 wt % to 69.5 wt %, or from 65.0 wt % to 69.5 wt %. In other embodiments, films may comprise from 20.0 wt % to 65.0 wt % LLDPE according to embodiments disclosed and described herein, such as from 20.0 wt % to 60.0 wt %, from 20.0 wt % to 55.0 wt %, from 20.0 wt % to 50.0 wt %, from 20.0 wt % to 45.0 wt %, from 20.0 wt % to 40.0 wt %, from 20.0 wt % to 35.0 wt %, from 20.0 wt % to 30.0 wt %, or from 20.0 wt % to 25.0 wt %. In still other embodiments, films may comprise from 25.0 wt % to 65.0 wt % LLDPE according to embodiments disclosed and described herein, such as from 30.0 wt % to 60.0 wt %, from 35.0 wt % to 55.0 wt %, or from 40.0 wt % to 50.0 wt %. In further embodiments, films may comprise from 40.0 wt % to 60.0 wt % LLDPE according to embodiments disclosed and described herein. It should be understood that the above weight percent ranges include the endpoints recited therein.

In embodiments, films may include 0.0 wt % LDPE. In some embodiments, films may comprise from 0.0 wt % to 10.0 wt %, such as from 0.5 wt % to 10.0 wt % LDPE, from 1.0 wt % to 10.0 wt %, from 1.5 wt % to 10.0 wt %, from 2.0 wt % to 10.0 wt %, from 2.5 wt % to 10.0 wt %, from 3.0 wt % to 10.0 wt %, from 3.5 wt % to 10.0 wt %, from 4.0 wt % to 10.0 wt %, from 4.5 wt % to 10.0 wt %, from 5.0 wt % to 10.0 wt %, from 5.5 wt % to 10.0 wt %, from 6.0 wt % to 10.0 wt %, from 6.5 wt % to 10.0 wt %, from 7.0 wt % to 10.0 wt %, from 7.5 wt % to 10.0 wt %, from 8.0 wt % to 10.0 wt %, from 8.5 wt % to 10.0 wt %, from 9.0 wt % to 10.0 wt %, or from 9.5 wt % to 10.0 wt %. In some embodiments, films may comprise from 0.5 wt % to 9.5 wt % LDPE, such as from 0.5 wt % to 9.0 wt %, from 0.5 wt % to 8.5 wt %, from 0.5 wt % to 8.0 wt %, from 0.5 wt % to 7.5 wt %, from 0.5 wt % to 7.0 wt %, from 0.5 wt % to 6.5 wt %, from 0.5 wt % to 6.0 wt %, from 0.5 wt % to 5.5 wt %, from 0.5 wt % to 5.0 wt %, from 0.5 wt % to 4.5 wt %, from 0.5 wt % to 4.0 wt %, from 0.5 wt % to 3.5 wt %, from 0.5 wt % to 3.0 wt %, from 0.5 wt % to 2.5 wt %, from 0.5 wt % to 2.0 wt %, from 0.5 wt % to 1.5 wt %, or from 0.5 wt % to 1.0 wt %. In still other embodiments, films may comprise from 1.0 wt % to 9.5 wt % LDPE, such as from 1.5 wt % to 9.0 wt %, from 2.0 wt % to 8.5 wt %, from 2.5 wt % to 8.0 wt %, from 3.0 wt % to 7.5 wt %, from 3.5 wt % to 7.0 wt %, from 4.0 wt % to 6.5 wt %, from 4.5 wt % to 6.0 wt %, or from 5.0 wt % to 5.5 wt %. It should be understood that the above weight percent ranges include the endpoints recited therein.

As described herein, the term "LDPE" is defined to mean that the polymer is partly or entirely homopolymerized or copolymerized in autoclave or tubular reactors at pressures above 14,500 psi (100 MPa) with the use of free-radical initiators, such as peroxides (see, for example, U.S. Pat. No. 4,599,392, which is hereby incorporated by reference). LDPE resins typically have a density in the range of 0.916 to 0.940 g/cm. The LDPE used in films, according to some embodiments, may be AGILITY™ EC 7000, LDPE 450E, LDPE 410E, LDPE 310E, and LDPE PG7008 manufactured by The Dow Chemical Company.

Films according to embodiments include from 30.0 wt % to 70.0 wt % of a pore former, such as from 35.0 wt % to 70.0 wt %, from 40.0 wt % to 70.0 wt %, from 45.0 wt % to 70.0 wt %, from 50.0 wt % to 70.0 wt %, from 55.0 wt % to 70.0 wt %, from 60.0 wt % to 70.0 wt %, or from 65.0 wt % to 70.0 wt %. In other embodiments, films include from 30.0 wt % to 65.0 wt % pore former, such as from 30.0 wt % to 60.0 wt %, from 30.0 wt % to 55.0 wt %, from 30.0 wt % to 50.0 wt %, from 30.0 wt % to 45.0 wt %, from 30.0 wt % to 40.0 wt %, or from 30.0 wt % to 35.0 wt %. In yet other embodiments, films include from 35.0 wt % to 65.0 wt % pore former, such as from 40.0 wt % to 60.0 wt %, or from 45.0 wt % to 55.0 wt %. It should be understood that the above weight percent ranges include the endpoints recited therein.

Pore formers that may be used in embodiments include calcium carbonate ($CaCO_3$), such as Filmlink™ 500 manufactured by Imerys or Omyafilm™ 753 manufactured by Omya.

Films may be formed from the compositions disclosed herein by any process, such as processes disclosed in U.S. Pat. Nos. 6,176,952; 3,338,992; 3,502,538; 3,502,763; 3,849,241; 4,041,203; 4,340,563; 4,374,888; 5,169,706; 7,230,511 and WO 2017/152065 all of which are incorporated herein by reference in their entirety.

The films formed herein are, according to embodiments, machine-direction oriented films. In various embodiments, the machine-direction oriented films may have an orientation ratio from 2.5× to 6.0×, such as from 3.0× to 6.0×, from 3.5× to 6.0×, from 4.0× to 6.0×, from 4.5× to 6.0×, from 5.0× to 6.0×, or from 5.5× to 6.0×. In other embodiments, the machine-direction oriented films may have an orientation ratio from 2.5× to 5.5×, such as from 2.5× to 5.0×, from 2.5× to 4.5×, from 2.5× to 4.0×, from 2.5× to 3.5×, or from 2.5× to 3.0×. In still other embodiments, the machine-direction oriented films may have an orientation ratio from 3.0× to 5.5×, such as from 3.5× to 5.0×, or from 4.0× to 4.5×. It should be understood that the above orientation ratio ranges include the endpoints recited therein. The above stretch ratio is calculated as ratio of the velocity of the film exiting the MDO unit to the velocity of the film entering the MDO unit.

Properties of films made from the combinations of LLDPE, LDPE, and pore formers disclosed herein will now be described. It should be understood that various films will have one or more of the properties disclosed herein, and that various combinations of LLDPE, LDPE, and pore formers may be combined to achieve a desired balance of properties depending on the end use of the film. As disclosed hereinabove, by using a combination of LLDPE as disclosed and described herein, LDPE, and pore formers, a desirable balance of properties may be achieved. Accordingly, one or more of the properties of films made according to embodiments disclosed herein may be similar to the same property in commercially available films. However, where one property of films made according to embodiments disclosed herein is similar to that property in commercially available films, another property of the film made according to embodiments disclosed herein will be superior to the commercially available film. Thus, it is a combination of all properties of films made according to embodiments disclosed herein that shows the improved performance of films made according to embodiments disclosed herein. For instance, a film made according to embodiments disclosed herein may have a similar hydrostatic pressure as a commercially available film, but the tear resistance in the film made according to embodiments disclosed herein may, in embodiments, be superior to the tear resistance of the commercially available film.

According to embodiments, films may have an average machine direction tear—according to Elmendorf Tear ASTM D 1922 measured at 14 grams per square meter (gsm)—that is greater than or equal to 5.0 grams force ($g_f$), such as greater than or equal to 5.1 $g_f$, greater than or equal to 5.2 $g_f$, greater than or equal to 5.3 $g_f$, greater than or equal to 5.4 $g_f$, greater than or equal to 5.5 $g_f$, greater than or equal to 5.6 $g_f$, greater than or equal to 5.7 $g_f$, greater than or equal to 5.8 $g_f$, greater than or equal to 5.9 $g_f$, or greater than or equal to 6.0 $g_f$. In embodiments, films may have an average machine direction tear from 5.0 $g_f$ to 7.0 $g_f$ such as from 5.2 $g_f$ to 7.0 $g_f$, from 5.4 $g_f$ to 7.0 $g_f$, from 5.6 $g_f$ to 7.0 $g_f$, from 5.8 $g_f$ to 7.0 $g_f$, from 6.0 $g_f$ to 7.0 $g_f$, from 6.2 $g_f$ to 7.0 $g_f$, from 6.4 $g_f$ to 7.0 $g_f$, from 6.6 $g_f$ to 7.0 $g_f$, or from 6.8 $g_f$ to 7.0 $g_f$. In other embodiments, films may have an average machine direction tear from 5.0 $g_f$ to 6.8 $g_f$, such as from 5.0 $g_f$ to 6.6 $g_f$, from 5.0 $g_f$ to 6.4 $g_f$, from 5.0 $g_f$ to 6.2 $g_f$, from 5.0 $g_f$ to 6.0 $g_f$, from 5.0 $g_f$ to 5.8 $g_f$, from 5.0 $g_f$ to 5.6 $g_f$, from 5.0 $g_f$ to 5.4 $g_f$, or from 5.0 $g_f$ to 5.2 $g_f$. In yet other embodiments, films may have an average machine direction tear from 5.2 $g_f$ to 6.8 $g_f$, such as from 5.4 $g_f$ to 6.6 $g_f$, from 5.6 $g_f$ to 6.4 $g_f$, or from 5.8 $g_f$ to 6.2 $g_f$. It should be understood that the above average machine direction tear ranges include the endpoints recited therein.

In embodiments, the machine-direction oriented film has a force in machine direction at 10% elongation—measured according to Secant Modulus ASTM D 638 measured at 14 gsm—of greater than or equal to 16.0 Newtons (N), such as greater than or equal to 16.2 N, greater than or equal to 16.4 N, greater than or equal to 16.6 N, greater than or equal to 16.8 N, greater than or equal to 17.0 N, greater than or equal to 17.2 N, greater than or equal to 17.4 N, greater than or equal to 17.6 N, or greater than or equal to 17.8 N. In embodiments, the machine-direction oriented film has a force at 10% elongation from 16.0 N to 18.0 N, such as from 16.2 N to 18.0 N, from 16.4 N to 18.0 N, from 16.6 N to 18.0 N, from 16.8 N to 18.0 N, from 17.0 N to 18.0 N, from 17.2 N to 18.0 N, from 17.4 N to 18.0 N, from 17.6 N to 18.0 N, or from 17.8 N to 18.0 N. In other embodiments, the machine-direction oriented film has a force at 10% elongation from 16.0 N to 17.8 N, such as from 16.0 N to 17.6 N, from 16.0 N to 17.4 N, from 16.0 N to 17.2 N, from 16.0 N to 17.0 N, from 16.0 N to 16.8 N, from 16.0 N to 16.6 N, from 16.0 N to 16.4 N, or from 16.0 N to 16.2 N. In yet other embodiments, the machine-direction oriented film has a force at 10% elongation from 16.2 N to 17.8 N, such as from 16.4 N to 17.6 N, from 16.6 N to 17.4 N, or from 16.8 N to 17.2 N. It should be understood that the above force at 10% elongation ranges include the endpoints recited therein.

Machine-direction oriented films according to embodiments may have an average water vapor transmission rate (WVTR)—according to ASTM D6701 measured at 14 gsm, 100% relative humidity (RH), and 38° C.—of greater than or equal to 15,000 gram per square meter per day (g/m²/day), such as greater than or equal to 15,250 g/m²/day, greater than or equal to 15,500 g/m²/day, greater than or equal to 15,750 g/m²/day, greater than or equal to 16,000 g/m²/day, greater than or equal to 16,250 g/m²/day, greater than or equal to 16,500 g/m²/day, or greater than or equal to 16,750 g/m²/day. In embodiments, machine-oriented films may have an average WVTR from 15,000 to 17,000 g/m²/day, such as from 15,250 to 17,000 g/m²/day, from 15,500 to 17,000 g/m²/day, from 15,750 to 17,000 g/m²/day, from 16,000 to 17,000 g/m²/day, from 16,250 to 17,000 g/m²/day, from 16,500 to 17,000 g/m²/day, or from 16,750 to 17,000 g/m²/day. In other embodiments, machine-oriented films may have an average WVTR from 15,000 to 16,750 g/m²/day, such as from 15,000 to 16,500 g/m²/day, from 15,000 to 16,250 g/m²/day, from 15,000 to 16,000 g/m²/day, from 15,000 to 15,750 g/m²/day, from 15,000 to 15,500 g/m²/day, or from 15,000 to 15,250 g/m²/day. In still other embodiments, machine-oriented films may have an average WVTR from 15,250 to 16,750 g/m²/day, such as from 15,500 to 16,500 g/m²/day, or from 15,750 to 16,250 g/m²/day. It should be understood that the above average WVTR ranges include the endpoints recited therein.

According to embodiments, machine-direction oriented films may have a hydrostatic pressure measured according to ISO 1420—at 14 gsm greater than or equal to 120 centimeters (cm) water, such as greater than or equal to 121 cm water, greater than or equal to 122 cm water, greater than or equal to 123 cm water, greater than or equal to 124 cm water, greater than or equal to 125 cm water, greater than or equal to 126 cm water, greater than or equal to 127 cm water, greater than or equal to 128 cm water, or greater than or equal to 129 cm water. In embodiments, machine-direction oriented films have a hydrostatic pressure from 120 to 130 cm water, such as from 121 to 130 cm water, from 122 to 130 cm water, from 123 to 130 cm water, from 124 to 130 cm water, from 125 to 130 cm water, from 126 to 130 cm water, from 127 to 130 cm water, from 128 to 130 cm water, or from 129 to 130 cm water. In other embodiments, machine-direction oriented films have a hydrostatic pressure from 120 to 129 cm water, such as from 120 to 128 cm water, from 120 to 127 cm water, from 120 to 126 cm water, from 120 to 125 cm water, from 120 to 124 cm water, from 120 to 123 cm water, from 120 to 122 cm water, or from 120 to 121 cm water. In still other embodiments, machine-direction oriented films have a hydrostatic pressure from 121 to 129 cm water, such as from 122 to 128 cm water, from 123 to 127 cm water, or from 124 to 126 cm water. It should be understood that the above hydrostatic pressure ranges include the endpoints recited therein.

According to embodiments, machine-direction oriented films may have a noise response in Sones measured according to method described below—at 18 gsm less than or equal to 5.9 Sones, less than or equal to 5.8 Sones, less than or equal to 5.7 Sones, less than or equal to 5.6 Sones, less than or equal to 5.5 Sones, less than or equal to 5.4 Sones, less than or equal to 5.3 Sones, less than or equal to 5.2 Sones, less than or equal to 5.1 Sones, less than or equal to 5.0 Sones, less than or equal to 4.9 Sones. In embodiments, machine-direction oriented films may have a noise level from 4.9 Sones to 5.7 Sones, such as from 5.0 Sones to 5.7 Sones, such as from 5.1 Sones to 5.7 Sones, such as from 5.2 Sones to 5.7 Sones, such as from 5.3 Sones to 5.7 Sones, such as from 5.4 Sones to 5.7 Sones, such as from 5.5 Sones to 5.7 Sones, such as from 5.6 Sones to 5.7 Sones. In still other embodiments, machine-direction oriented films may have a noise level from 4.9 Sones to 5.6 Sones, such as from 4.9 Sones to 5.5 Sones, such as from 4.9 Sones to 5.4 Sones, such as from 4.9 Sones to 5.3 Sones, such as from 4.9 Sones to 5.2 Sones, such as from 4.9 Sones to 5.1 Sones, such as from 4.9 Sones to 5.0 Sones. It should be understood that the above noise ranges include the endpoints recited therein.

Films as disclosed and described herein may be used as breathable backsheets for end products, such as, for example, infant and child diapers, child overnight products, adult continence products, feminine hygiene products, bandages, etc.

Test Methods

The testing methods include the following:

Melt index ($I_2$) and ($I_{10}$)

Melt index ($I_2$) values for the ethylene-based polymers measured in accordance to ASTM D1238 at 190° C. at 2.16 kg. Similarly, melt index ($I_{10}$) values for the ethylene-based polymers were measured in accordance to ASTM D1238 at 190° C. at 10 kg. The values are reported in g/10 min, which corresponds to grams eluted per 10 minutes.

Density

Density measurements for the ethylene-based polymers were made in accordance with ASTM D792, Method B.

Conventional Gel Permeation Chromatography (Conventional GPC)

The chromatographic system consisted of a PolymerChar GPC-IR (Valencia, Spain) high temperature GPC chromatograph equipped with an internal IR5 infra-red detector (IR5). The autosampler oven compartment was set at 160° C. and the column compartment was set at 150° C. The columns used were 4 Agilent "Mixed A" 30 cm 20-micron linear mixed-bed columns. The chromatographic solvent used was 1,2,4 trichlorobenzene and contained 200 ppm of butylated hydroxytoluene (BHT). The solvent source was nitrogen sparged. The injection volume used was 200 microliters and the flow rate was 1.0 milliliters/minute.

Calibration of the GPC column set was performed with at least 20 narrow molecular weight distribution polystyrene standards with molecular weights ranging from 580 to 8,400,000 g/mol and were arranged in 6 "cocktail" mixtures with at least a decade of separation between individual molecular weights. The standards were purchased from Agilent Technologies. The polystyrene standards were prepared at 0.025 grams in 50 milliliters of solvent for molecular weights equal to or greater than 1,000,000 g/mol, and 0.05 grams in 50 milliliters of solvent for molecular weights less than 1,000,000 g/mol. The polystyrene standards were dissolved at 80° C. with gentle agitation for 30 minutes. The polystyrene standard peak molecular weights were converted to ethylene-based polymer molecular weights using the Equation 1 (as described in Williams and Ward, J. Polym. Sci., Polym. Let., 6, 621 (1968)):

$$M_{polyethylene} = A \times (M_{polystyrene})^B \quad \text{(Equation 1)}$$

where M is the molecular weight, A has a value of 0.4315 and B is equal to 1.0.

A fifth order polynomial was used to fit the respective ethylene-based polymer-equivalent calibration points. A small adjustment to A (from approximately 0.39 to 0.44) was made to correct for column resolution and band-broadening effects such that NIST standard NBS 1475 is obtained at a molecular weight of 52,000 g/mol.

The total plate count of the GPC column set was performed with Eicosane (prepared at 0.04 g in 50 milliliters of TCB and dissolved for 20 minutes with gentle agitation). The plate count (Equation 2) and symmetry (Equation 3) were measured on a 200 microliter injection according to the following equations:

$$\text{Plate Count} = 5.54 \times \left( \frac{RV_{Peak\ Max}}{\text{Peak Width at half height}} \right)^2 \quad \text{(Equation 2)}$$

where RV is the retention volume in milliliters, the peak width is in milliliters, the peak max is the maximum height of the peak, and half height is one half of the height of the peak maximum.

$$\text{Symmetry} = \frac{(\text{Rear Peak } RV_{one\ tenth\ height} - RV_{Peak\ max})}{(RV_{Peak\ max} - \text{Front Peak } RV_{one\ tenth\ height})} \quad \text{(Equation 3)}$$

where RV is the retention volume in milliliters and the peak width is in milliliters, Peak max is the maximum position of the peak, one tenth height is one tenth of the height of the peak maximum, and where rear peak refers to the peak tail at later retention volumes than the peak max and where front peak refers to the peak front at earlier retention volumes than the peak max. The plate count for the chromatographic system should be greater than 22,000 and symmetry should be between 0.98 and 1.22.

Samples were prepared in a semi-automatic manner with the PolymerChar "Instrument Control" Software, wherein the samples were weight-targeted at 2 mg/ml, and the solvent (contained 200 ppm BHT) was added to a pre nitrogen-sparged septa-capped vial, via the PolymerChar high temperature autosampler. The samples were dissolved for 3 hours at 160° C. under "low speed" shaking.

The calculations of $M_{n(GPC)}$, $M_{w(GPC)}$, and $M_{z(GPC)}$ were based on GPC results using the internal IR5 detector (measurement channel) of the PolymerChar GPC-IR chromatograph according to Equations 4-7, using PolymerChar GPCOne™ software, the baseline-subtracted IR chromatogram at each equally-spaced data collection point i ($IR_i$) and the ethylene-based polymer equivalent molecular weight obtained from the narrow standard calibration curve for the point i ($M_{polyethylene,i}$ in g/mol) from Equation 1. Subsequently, a GPC molecular weight distribution (GPC-MWD) plot ($wt_{GPC}(lgMW)$ vs. lgMW plot, where $wt_{GPC}(lgMW)$ is the weight fraction of ethylene-based polymer molecules with a molecular weight of lgMW) for the ethylene-based polymer sample can be obtained. Molecular weight is in g/mol and $wt_{GPC}(lgMW)$ follows the Equation 4.

$$\int wt_{GPC}(lg\ MW)d\ lgMW = 1.00 \quad \text{(Equation 4)}$$

Number-average molecular weight $M_{n(GPC)}$, weight-average molecular weight $M_{w(GPC)}$ and z-average molecular weight $M_{z(GPC)}$ can be calculated as the following equations.

$$Mn_{(GPC)} = \frac{\sum_i IR_i}{\sum_i (IR_i / M_{polyethylene,i})} \quad \text{(Equation 5)}$$

$$Mw_{(GPC)} = \frac{\sum_i (IR_i * M_{polyethylene,i})}{\sum_i IR_i} \quad \text{(Equation 6)}$$

$$Mz_{(GPC)} = \frac{\sum_i (IR_i * M^2_{polyethylene,i})}{\sum_i (IR_i * M_{polyethylene,i})} \quad \text{(Equation 7)}$$

In order to monitor the deviations over time, a flow rate marker (decane) was introduced into each sample via a micropump controlled with the PolymerChar GPC-IR system. This flow rate marker (FM) was used to linearly correct the pump flow rate (Flowrate(nominal)) for each sample by RV alignment of the respective decane peak within the sample (RV(FM Sample)) to that of the decane peak within the narrow standards calibration (RV(FM Calibrated)). Any changes in the time of the decane marker peak are then assumed to be related to a linear-shift in flow rate (Flowrate (effective)) for the entire run. To facilitate the highest accuracy of a RV measurement of the flow marker peak, a least-squares fitting routine is used to fit the peak of the flow marker concentration chromatogram to a quadratic equation. The first derivative of the quadratic equation is then used to solve for the true peak position. After calibrating the system based on a flow marker peak, the effective flow rate (with respect to the narrow standards calibration) is calculated as Equation 8. Processing of the flow marker peak was done via the PolymerChar GPCOne™ Software. Acceptable flow rate correction is such that the effective flowrate should be within 0.5% of the nominal flowrate.

Flow rate$_{effective}$=Flow rate$_{nominal}$×(RV(FM$_{calibrated}$)/ RV(FM$_{Sample}$)) (Equation 8)

Crystallization Elution Fractionation (CEF)

Comonomer distribution analysis, also commonly called short chain branching distribution (SCBD), is measured with Crystallization Elution Fractionation (CEF) (PolymerChar, Spain) (Monrabal et al, Macromol. Symp. 257, 71-79 (2007), which is incorporated herein by reference in its entirety) equipped with an IR (IR-4 or IR-5) detector (PolymerChar, Spain) and 2-angle light scattering detector Model 2040 (Precision Detectors, currently Agilent Technologies). Distilled anhydrous ortho-dichlorobenzene (ODCB) with 600 ppm antioxidant butylated hydroxytoluene (BHT) was used as solvent. For the autosampler with the capability of $N_2$ purge, no BHT was added. A GPC guard column (20 microns, or 10 microns, 50×7.5 mm) (Agilent Technologies) is installed just before the IR detector in the detector oven. Sample preparation is done with an autosampler at 160° C. for 2 hours under shaking at 4 mg/ml (unless otherwise specified). The injection volume is 300 µl. The temperature profile of CEF is: crystallization at 3° C./min from 110° C. to 30° C., the thermal equilibrium at 30° C. for 5 minutes, elution at 3° C./min from 30° C. to 140° C. The flow rate during crystallization was at 0.052 ml/min. The flow rate during elution is at 0.50 ml/min. The data was collected at one data point/second.

The CEF column is packed by The Dow Chemical Company with glass beads at 125 µm±6% (MO-SCI Specialty Products) with ⅛-inch stainless tubing. Glass beads are acid washed by MO-SCI Specialty by request from The Dow Chemical Company. Column volume is 2.06 ml. Column temperature calibration was performed by using a mixture of NIST Standard Reference Material Linear ethylene-based polymer 1475a (1.0 mg/ml) and Eicosane (2 mg/ml) in ODCB. Temperature was calibrated by adjusting elution heating rate so that NIST linear ethylene-based polymer 1475a has a peak temperature at 101.0° C., and Eicosane has a peak temperature of 30.0° C. The CEF column resolution was calculated with a mixture of NIST linear ethylene-based polymer 1475a (1.0 mg/ml) and hexacontane (Fluka, purum≥97.0%, 1 mg/ml). A baseline separation of hexacontane and NIST ethylene-based polymer 1475a was achieved. The area of hexacontane (from 35.0 to 67.0° C.) to the area of NIST 1475a from 67.0 to 110.0° C. is 50 to 50, the amount of soluble fraction below 35.0° C. is less than 1.8 wt. %. The CEF column resolution is defined in Equation 9:

$$\text{Resolution} = \frac{\text{Peak Temperature}_{NIST\ 1475A} - \text{Peak Temperature}_{Hexacontane}}{\text{Width at Half Height}_{NIST\ 1475A} + \text{Width at Half Height}_{Hexacontane}} \geq 6.0 \quad \text{(Equation 9)}$$

where the half height width is measured in temperature and resolution is at least 6.0.

Short Chain Branching Distribution (SCBD)—CEF Full Width at Half Height

An additional parameter to describe the short chain branching distribution is the CEF full width at half height. This is done by the procedure outlined below:

(A) Obtain a weight fraction at each temperature (T) ($w_T(T)$) from 20.0° C. to 119.0° C. with a temperature step increase of 0.20° C. from CEF according to the following equation:

$$\int_{20.0}^{119.0} w_T(T)dT = 1, \text{ and} \quad \text{(Equation 13)}$$

(B) Obtain maximum peak height from CEF comonomer distribution profile by searching each data point for the highest peak from 35.0° C. to 119.0° C. The SCBD CEF full width at half height is defined as the entire temperature difference between the front temperature and the rear temperature at the half of the maximum peak height. The front temperature at the half of the maximum peak is searched forward from 35.0° C., and is the first data point that is greater than or equal to half of the maximum peak height. The rear temperature at the half of the maximum peak is searched backward from 119.0° C., and is the first data point that is greater than or equal to half of the maximum peak height.

The high density fraction (HDF) can be calculated as an integral from the CEF curve from 93° C. to 119° C. This is defined as the integral of the IR-4 chromatogram (baseline subtracted measurement channel) in the elution temperature ranging from 93° C. to 119° C. divided by the total integral from 20° C. to 140° C. according to the following equation:

$$HDF = \frac{\int_{93.0}^{119.0} IR\,dT}{\int_{20.0}^{140.0} IR\,dT} * 100\% \qquad \text{(Equation 14)}$$

where T is the elution temperature (from the calibration discussed above).

Zero-Shear Viscosity Ratio (ZSVR)

Zero-shear viscosity ratio is defined as the ratio of the zero-shear viscosity (ZSV) of the branched polyethylene material to the ZSV of a linear polyethylene material (see ANTEC proceeding below) at the equivalent weight average molecular weight in g/mol ($M_{w(GPC)}$), according to the following Equation 15:

$$ZSVR = \frac{\eta_{0B}}{\eta_{0L}} = \frac{\eta_{0B}}{2.29 \times 10^{-15} \text{Pa} \cdot \text{sec} \cdot \left(\frac{g}{\text{mol}}\right)^{-3.65} \times M_{w(GPC)}^{3.65}} \qquad \text{(Equation 15)}$$

The ZSV value of the LLDPE based polymer ($\eta_{0B}$) was obtained from creep test, at 190° C., via the method described below. The $M_{w(GPC)}$ value was determined by the conventional GPC method (Equation 6), as discussed above. The correlation between ZSV of linear polyethylene ($\eta_{0L}$) and its $M_w$(GPC) was established based on a series of linear polyethylene reference materials. A description for the ZSV-$M_{w(GPC)}$ relationship can be found in the ANTEC proceeding: Karjala et al., *Detection of Low Levels of Long-chain Branching in Polyolefins*, Annual Technical Conference—Society of Plastics Engineers (2008), 66th 887-891.

Creep Test

The ZSV value of the LLDPE polymer ($\eta_{0B}$) was obtained from a constant stress rheometer creep test at 190° C. in a nitrogen environment using DHR, TA Instrument. The LLDPE samples were subjected to flow between two 25 mm diameter plate fixtures positioned parallel to each other. Samples were prepared by compression molding pellets of LLDPE into circular plaques of about 1.5-2.0 mm thick. The plaques were further cut into 25 mm diameter disks and sandwiched between the plate fixtures of the TA Instrument. The oven on the TA instrument was closed for 5 minutes after sample loading and before setting the gap between the plate fixtures to 1.5 mm, opening the oven to trim the edges of the sample, and reclosing the oven. A logarithmic frequency sweep between 0.1 to 100 radians/second at 190° C., 300 seconds of soak time, and 10% strain was conducted before and after the creep test to determine whether the sample degraded. A constant low shear stress of 20 Pa was applied for all of the samples, to ensure that the steady state shear rate was low enough to be in the Newtonian region. Steady state was determined by taking a linear regression for the data in the last 10% time window of the plot of "lg(J(t)) vs. lg(t)", where J(t) was creep compliance and t was creep time. If the slope of the linear regression was greater than 0.97, steady state was considered to be reached, then the creep test was stopped. In all cases in this study, the slope meets the criterion within one hour. The steady state shear rate was determined from the slope of the linear regression of all of the data points, in the last 10% time window of the plot of "c vs. t", where c was strain. The zero-shear viscosity was determined from the ratio of the applied stress to the steady state shear rate.

Machine-Direction Orientation Tear

Tear in machine direction was measured according to Elmendorf Tear ASTM D 1922 measured at 14 gsm. An average value of 15 specimens were reported.

Machine-Direction Force at 10% Elongation

Force in machine direction at 10% elongation was measured according to ASTM D 638. Rectangular film samples were cut along the machine direction with a 1 inch wide and 6 inches long. The grip-to-grip distance was 4 inches. Samples were stretched to 15% elongation with an Instron tensile machine at a tensile speed of 20 inch/minute. The force at 10% elongation was recorded. An average value of 5 specimens were reported.

Water Vapor Transmission Rate (WVTR)

WVTR was measured according to ASTM D 6701 measured at 14 gsm, 100% relative humidity, and 38° C. using a Mocon PERMATRAN-W 101K. An average value of 6 specimens were reported.

Hydrostatic Pressure

Hydrostatic pressure was measured according to ISO 1420 measured at 14 gsm. An average value of 3 specimens were reported.

Noise Measurement

Figure 3A:
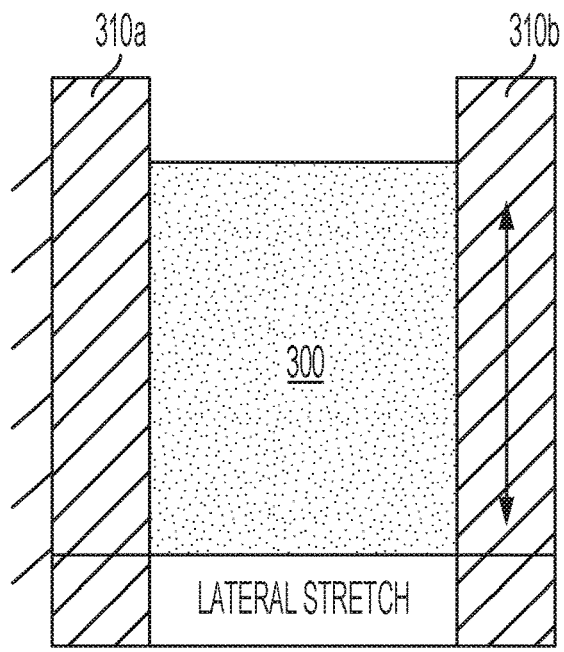
FIG. 3A and FIG. 3B are schematics of a test set-up to measure noise according to embodiments disclosed and described herein.
Figure 3B:
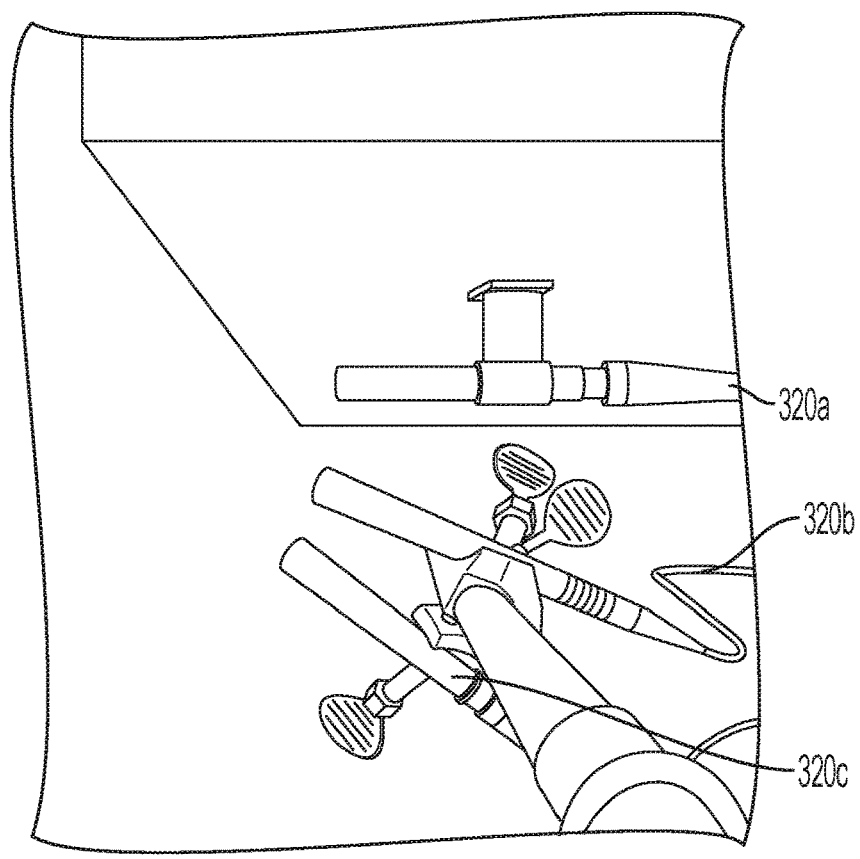

A test setup as shown in FIG. 3A and FIG. 3B is designed to measure and quantify the noise. In particular, FIG. 3A shows a film 300 positioned between two supports 310a, 310b, and the supports 310a, 310b are moved in the direction show by the arrows to laterally stretch the film 300. FIG. 3B shows a test set up where three microphones 320a, 320b, 320c are positioned about 2 inches to 3 inches away from the film while it is being stretched to record the noise. To avoid the influence of background noise on sample measurements, the tests are conducted in an anechoic chamber that has low ambient noise floor as given Table 1 below. Film samples of size 10×20 cm are cut from film rolls and measured. One of the long side of the film sample is locked vertically to prevent movement and the opposite, free end, is actuated along the vertical axes as shown by double-sided red arrow in below Figure (at a rate of 1 Hz). The noise generated is captured by three microphones (placed at a distance of 6 cm from the specimen) as shown in below Figure. Data acquisition and post processing is done using industry standard B&K software and hardware; actuation is done for 20 [sec] at a sampling rate of 32.768 [kHz] and the data is post-processed to evaluate the loudness in Sones. The test is repeated three times and average/standard deviation of the runs are reported.

TABLE 1

| Octave band (Hz) | SPL, dB |
|---|---|
| 125 | 33.8 |
| 250 | 23.3 |
| 500 | 17.7 |
| 1000 | 18.9 |
| 2000 | 10.7 |
| 4000 | 11.5 |
| 8000 | 12.9 |

EXAMPLES

The following examples illustrate features of the present disclosure but are not intended to limit the scope of the disclosure.

Example 1

An ethylene-based polymer was formed using a loop reactor as the first reactor and a plug flow reactor as the second reactor. The feed stream into the first reactor included 1327 pounds per hour (lb/hr) ISOPAR-E solvent, 186 lb/hr ethylene monomer, 25 lb/hr octene. Hydrogen was also introduced into the first reactor at 6200 sccm. The first reactor exit ethylene concentration was 17 g/L. The first catalyst introduced into the first reactor included a procatalyst and a cocatalyst. The procatalyst was zirconium, dimethyl[[2,2'''-[[bis[1-methylethyl)germylene]bis(methyleneoxy-κO)]bis[3'',5,5''-tris(1,1-dimethylethyl)-5'-octyl[1,1':3', 1''-terphenyl]-2'-olato-κO]](2-)] having the following structure:

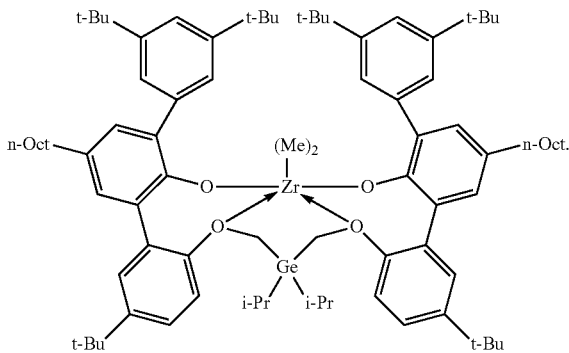

The procatalyst was added as needed to control 17 g/L reactor exit ethylene concentration and procatalyst loading was typically 0.80 μmon in the reactor exit. The cocatalysts were bis(hydrogenated tallow alkyl)methyl, tetrakis(pentafluorophenyl)borate(1-) amine and triethylaluminum.

The first reactor was heated to a temperature of 190° C. and the ethylene monomer and octene reacted in the presence of the first catalyst to form a first polymer fraction.

A second catalyst was added to the effluent downstream from the first reactor and upstream from the second reactor to form a modified effluent. The second catalyst was a Ziegler-Natta catalyst at a concentration of about 1.9 μmon. The modified effluent was introduced into the second, plug flow reactor where the unreacted ethylene and the unreacted octene and unreacted hydrogen reacted in the presence of the second catalyst to form a second polymer fraction.

The bimodal ethylene-based polymer produced in the foregoing example comprised 91.7 wt. % first polymer fraction, 8.3 wt. % second polymer fraction measured using traditional modeling of ethylene consumption in the first and second reactors. The bimodal ethylene-based polymer had a melt index ($I_2$) of 3.56 g/10 min, a density of 0.9154 g/cc, and an $I_{10}/I_2$ ratio of 5.75, each measured in accordance with the techniques disclosed previously.

Example 1 and Comparative Examples 1-5

Example 1 comprises: a combination of 45 wt % LLDPE, the type of which as indicated in Table 1 as Resin 1; 5 wt % AGILITY™ EC 7000 manufactured by The Dow Chemical Company as the LDPE component; and 50 wt % $CaCO_3$ Filmlink™ 500 manufactured by Imerys as the pore former. Details are reported in Table 2.

Comparative Examples 1-5 comprise: a combination of 45 wt % LLDPE, the type of which as indicated in Table 1 as Comparative Resin 1-4; 5 wt % AGILITY™ EC 7000 manufactured by The Dow Chemical Company as the LDPE component; and 50 wt % $CaCO_3$ Filmlink™ 500 manufactured by Imerys as the pore former. Details are reported in Table 2.

Examples 2 and 3 comprise: a combination of 50 wt % LLDPE, the type of which as indicated in Table 1 as Resin 1; and 50 wt % $CaCO_3$ Filmlink™ 500 manufactured by Imerys as the pore former. Details are reported in Table 3.

Comparative Examples 6-10 comprise: a combination of 50 wt % LLDPE, the type of which as indicated in Table 1 as Comparative Resin 1, 3 and 4; and 50 wt % $CaCO_3$ Filmlink™ 500 manufactured by Imerys as the pore former. Details are reported in Table 3.

DOWLEX™ 2047G and ELITE™ 5220 G are manufactured by The Dow Chemical Company, and EXCEED™ 3518CB is manufactured by the ExxonMobil Corporation. The composition of the LLDPE of comparative Example 5 is described in WO 2017/152065, which is incorporated by reference herein in its entirety. Properties of the LLDPE based polymers are shown in Table 2 below.

TABLE 2

|  | $I_2$ (g/10 min) | $I_{10}/I_2$ | Density (g/cm³) | ZSVR | HDFby CEF (%) | SCBD width at half height by CEF (° C.) |
| --- | --- | --- | --- | --- | --- | --- |
| Resin: Example 1 | 3.6 | 5.8 | 0.915 | 1.59 | 4.6 | 6.8 |
| Comparative resin 1: DOWLEX ™ 2047G | 2.3 | 7.5 | 0.920 | 1.20 | 19.3 | 31.8 |
| Comparative resin 2: ELITE ™ 5220G | 3.5 | 6.7 | 0.915 | 1.83 | 10.9 | 9.2 |
| Comparative resin 3: EXCEED ™ 3518CB | 3.5 | 5.6 | 0.918 | 1.10 | 4.7 | 15.6 |
| Comparative resin 4: Example 5 of WO2017/152065 | 3.6 | 6.8 | 0.920 | 2.49 | 1.0 | 4.2 |

For Example 1 and Comparative Examples 1-5 the ethylene-based polymer, AGILITY™ EC 7000, and Filmlink™ 500 CaCO$_3$ were compounded on a Coperion ZSK 26 twin screw extruder. Barrel length was 100 mm per with 15 barrels comprising the entire process section. Screw diameter was 25.5 mm with a flight depth of 4.55 mm. The screw design used was the General Purpose Screw. The residence time of material was controlled by the screw design, feed rate of 25 lbs./hr., and a screw RPM of 400. No oil was injected. There was no side arm feeder. For Example 1 and Comparative Examples 1-5, the ethylene-based polymer and Agility™ EC 7000 pellets were dry blended by drum rotation in a ratio of 90:10 by weight prior to being fed directly into the main feed throat of the ZSK26 by a K-Tron, T-20, LWF, K-11 feeder. The Filmlink™ 500 CaCO$_3$ was simultaneously fed into the main feed throat of the ZSK 26 by a K-Tron, T-20, LWF, K-7 feeder with powder screw and fluffer installed. The K-7 feeder and K-11 feeder operated such that 50 wt % blend: 50 wt % CaCO$_3$ was delivered to the ZSK 26. Nitrogen was also fed into the feed throat adapter at 5 SCFH to sweep drop pipe which brings the material to the extruder. Zone 2 temperature was 115° C., Zone 3 was 190° C., and Zone 4-15 and die extruder temperature was 200° C. There was no vacuum pulled. The compounded material was sent through a water bath after exiting the ZSK-26 and before being cut by a strand cut pelletizer. After collection, the pelletized materials were nitrogen purged and sealed in air tight bags. After the product was packaged it was sent off to a separate laboratory for film extrusion, stretching, and testing.

For Example 2-3 and Comparative Examples 6-10 the ethylene-based polymer, and Filmlink™ 500 CaCO$_3$ were compounded on a BUSS Compounder MDK/E 46 (BUSS S.A. Basel, Switzerland). Compounding conditions are summarized in Table 3 below. Each of the resulting compounds were dried for six hours at 60° C. and then packed in aluminum bags to avoid moisture pick-up before extrusion.

TABLE 3

| T screw (° C.) | T Z1 (° C.) | T Z2 (° C.) | T ASV (° C.) | T DIE (° C.) | Kneading speed (rpm) | ASV speed (rpm) | DIE dimensions | Cutter speed (n) |
|---|---|---|---|---|---|---|---|---|
| 110 | 130 | 135 | 130 | 135 | 110 | 60 | 3 | 5 |

Monolayer, machine direction-oriented (MDO) films were produced from all the above combination on a Collin cast MDO line as follows. MDO films were fabricated using a Collin cast MDO line. The Collin cast MDO line is equipped with a cast film unit and an online MDO unit. The cast film unit has three extruders (25/30/25 mm) and a slot die (0.7 mm die gap). Monolayer cast films are first produced with the cast film unit at a throughput rate of 2 kg/h. The films are quenched on a chill roll (chill roll temperature=20° C.) in the cast film unit before entering the online MDO unit. The preheat roll temperature in the online MDO unit is set at a temperature that is 15° C. lower than the draw temperature (or stretch temperature). Stretch temperature was 60° C. The film is stretched in machine direction in the MDO unit and the machine direction orientation ratios (or stretch ratios) of the MDO films are shown in Table 2 and Table 3. Final film thickness (after MDO) for Example 1 and Comparative Examples 1-5 is fixed at 14 GSM. Final film thickness (after MDO) for Examples 2-3 and Comparative Examples 6-10 is fixed at 18 GSM.

Machine direction orientation ratio was measured as ratio of the velocity of the film existing the MDO unit to the velocity of the film entering the MDO unit.

The properties of the film comprising the resin of Example 1 and the films comprising the resins of Comparative Examples 1 to 5, which were formed according to the above methods are shown below in Table 4.

TABLE 4

| Example | Composition | Machine Direction Orientation Ratio | WVTR-Avg-Transmission Rate (g/m$^2$/day) | Hydrostatic pressure (cm Water) | Average machine direction Tear (g$_f$) | Force in machine direction at 10% elongation (Newtons) |
|---|---|---|---|---|---|---|
| Film 1 | 45 wt % Example 1 5 wt % AGILITY ™ EC 7000 50 wt % CaCO$_3$ | 5.6x | 16418 | 125 | 5.3 | 16 |

TABLE 4-continued

| Example | Composition | Machine Direction Orientation Ratio | WVTR-Avg-Transmission Rate (g/m²/day) | Hydrostatic pressure (cm Water) | Average machine direction Tear (g_f) | Force in machine direction at 10% elongation (Newtons) |
|---|---|---|---|---|---|---|
| Comp. Film 1 | 45 wt % DOWLEX ™ 2047G<br>5 wt % AGILITY ™ EC 7000<br>50 wt % CaCO₃ | 5.3x | 6746 | 115 | 4.8 | 12.3 |
| Comp. Film 2 | 45 wt % DOWLEX ™ 2047G<br>5 wt % AGILITY ™ EC 7000<br>50 wt % CaCO₃ | 5.8x | 7416 | 126 | 4.9 | 18.9 |
| Comp. Film 3 | 45 wt % ELITE ™ 5220G<br>5 wt % AGILITY ™ EC 7000<br>50 wt % CaCO₃ | 5.8x | 9770 | 114 | 4.3 | 11.6 |
| Comp. Film 4 | 45 wt % EXCEED ™ 3518CB<br>5 wt % AGILITY ™ EC 7000<br>50 wt % CaCO₃ | 4.0x | 12350 | 110 | 4.7 | 14.6 |
| Comp. Film 5 | 45 wt % Example 5 of WO2017/152065<br>5 wt % AGILITY ™ EC 7000<br>50 wt % CaCO₃ | 5.3x | 20830 | 96 | 4.0 | 15.9 |

Figure 2:
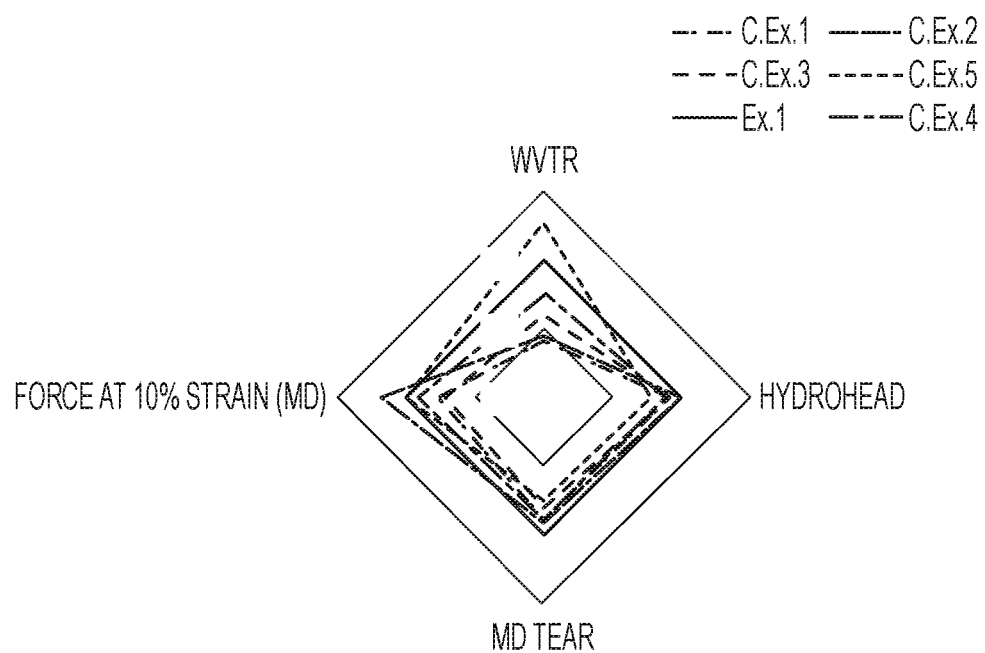
FIG. 2 graphically depicts the properties of films of Example 1, which was produced according to embodiments disclosed and described herein, and Comparative Examples 1-5.

As can be seen in Table 4 the film according to Example 1 has a better balance of machine direction tear, machine direction force at 10% elongation, WVTR, and hydrostatic pressure than the films according to Comparative Examples 1-5. These results are graphically depicted in FIG. 2, which shows hydrostatic pressure results (in cm water) of Example 1 and Comparative Examples 1-5 on the positive x-axis, machine direction tear results (in g_f) of Example 1 and Comparative Examples 1-5 on the negative y-axis, machine direction force at 10% strain results (in Newtons) of Example 1 and Comparative Examples 1-5 on the negative x-axis, and WVTR results (in g/m²/day) of Example 1 and Comparative Examples 1-5 on the positive y-axis.

As can be seen from the examples and comparative examples, films made according to embodiments disclosed and described herein provide improved overall balance of properties. For instance, Comparative Example 5 has a higher WVTR value than Example 1, but Example 1 outperforms Comparative Example 1 in hydrostatic pressure and average machine direction tear. Similarly, Comparative Example 2 has the highest force in machine direction at 10% elongation of the example and comparative examples, but Example 1 outperforms Comparative Example 2 in all other measured categories. Accordingly, each of the comparative examples targets high performance of a certain property at the expense of other properties, but Example 1 provides values for each measured property at or near the maximum value achieved by any one of the comparative examples. Thus, the film of example 1 provides a better overall film than any of the comparative examples.

TABLE 5

| Example | Composition | Machine Direction Orientation Ratio | Noise (Sones) |
|---|---|---|---|
| Ex. 2 | 50 wt % Example 1<br>50 wt % CaCO₃ | 5.1x | 5.7 |
| Comp. Ex. 6 | 50 wt % DOWLEX ™ 2047G<br>50 wt % CaCO₃ | 5.2x | 5.9 |
| Comp. Ex. 9 | 50 wt % Example 5 of WO2017/152065<br>50 wt % CaCO₃ | 5.2x | 6.9 |
| Ex. 3 | 50 wt % Example 1<br>50 wt % CaCO₃ | 5.8x | 6.0 |
| Comp. Ex. 7 | 50 wt % DOWLEX ™ 2047G<br>50 wt % CaCO₃ | 5.8x | 6.3 |
| Comp. Ex. 8 | 50 wt % EXCEED ™ 3518CB<br>50 wt % CaCO₃ | 5.7x | 7.1 |
| Comp. Ex. 10 | 50 wt % Example 5 of WO2017/152065<br>50 wt % CaCO₃ | 5.7x | 7.9 |

As can be seen in Table 5, at same machine direction orientation ratio, Examples 2-3 outperform Comparative Examples 6-10 when it comes to loudness as measured. The improvement in loudness is irrespective of the machine direction orientation ratio used.

It will be apparent that modifications and variations are possible without departing from the scope of the disclosure defined in the appended claims. More specifically, although some aspects of the present disclosure are identified herein as preferred or particularly advantageous, it is contemplated that the present disclosure is not necessarily limited to these aspects. Additionally, all ranges recited in this disclosure include the endpoints of the ranges unless specifically state otherwise (such as by "less than" or "greater than").

The invention claimed is:

1. A film comprising:
   20.0 weight percent to 69.5 weight percent linear low density polyethylene (LLDPE) based polymer, wherein the LLDPE based polymer comprises
      a high density fraction (HDF) from 3.0% to 8.0%, wherein the high density fraction is measured by crystallization elution fractionation (CEF) integration at temperatures from 93° C. to 119° C.,
      an $I_{10}/I_2$ ratio from 5.5 to 6.9, wherein $I_2$ is the melt index when measured according to ASTM D 1238 at a load of 2.16 kg and temperature of 190° C. and I10 is the melt index when measured according to ASTM D 1238 at a load of 10 kg and temperature of 190° C., and
      a short chain branching distribution (SCBD) of less than or equal to 7.0° C., wherein the short chain branching distribution is measured by CEF full width at half height;
   0.0 weight percent to 10.0 weight percent low density polyethylene (LDPE) based polymer; and
   30.0 weight percent to 70.0 weight percent pore former.

2. A film according to claim 1, wherein the film comprises from 40.0 weight percent to 60.0 weight percent LLDPE based polymer.

3. A film according to claim 1, wherein the LLDPE based polymer has a zero shear viscosity ratio from 1.1 to 3.0.

4. A film according to claim 1, wherein the LLDPE based polymer has a $I_{10}/I_2$ ratio from 5.5 to 6.5.

5. A film according to claim 1, wherein:
   the LLDPE based polymer has a density of 0.910 to 0.925 g/cm$^3$; and
   the density is measured according to ASTM D792, Method B.

6. A film according to claim 1, wherein:
   the LLDPE based polymer has an $I_2$ from 1.0 to 6.0 g/10 mins; and
   the $I_2$ is measured according to ASTM D 1238 at a load of 2.16 kg.

7. A film according to claim 1, wherein the LLDPE based polymer has an $I_2$ from 3.0 to 4.0 g/10 mins.

8. A film according to claim 1, wherein the film is a machine-direction oriented film.

9. A film according to claim 8, wherein:
   the film has a machine-direction orientation ratio from 2.5× to 6.0×; and
   the machine-direction orientation ratio is calculated as ratio of the velocity of the film exiting the MDO unit to the velocity of the film entering the MDO unit.

10. A film according to claim 1, wherein:
    the film has an average machine-direction tear greater than or equal to 5.0 gf; and
    the average machine-direction tear is measured according to Elmendorf Tear ASTM D 1922 measured at 14 gsm.

11. A film according to claim 1, wherein:
    the film has an average machine-direction force at 10% elongation of greater than or equal to 16.0 Newtons; and
    the average machine-direction force at 10% elongation is measured according to ASTM D 638 at a tensile speed of 20 inch/minute and measured at 14 gsm.

12. A film according to claim 1, wherein:
    the film has an average water vapor transmission rate of greater than or equal to 15,000 g/m$^2$/day; and
    the average water vapor transmission rate is measured according to ASTM D6701 measured at 14 gsm, 100% RH, and 38° C.

13. A film according to claim 1, wherein:
    the film has a hydrostatic pressure of greater than or equal to 120 cm water; and
    the hydrostatic pressure is measured according to ISO 1420 measured at 14 gsm.

14. A film according to claim 1, wherein
    the film has a loudness of less than 5.9 sones, wherein the loudness is measured at 18 gsm and a machine direction orientation ratio of less than or equal to 5.2×, or
    the film has a loudness of less than 6.3 sones, wherein the loudness is measured at 18 gsm and a machine direction orientation ratio greater than 5.2× and less than or equal to 5.8×.

15. A hygiene absorbent product comprising the film according to claim 1.

16. A film according to claim 1, wherein the film has:
    an average water vapor transmission rate (WVTR) of greater than or equal to 15,000 g/m$^2$/day, measured according to ASTM D6701 measured at 14 gsm, 100% RH, and 38° C.;
    a hydrostatic pressure of greater than or equal to 120 cm water, measured according to ISO 1420 measured at 14 gsm;
    an average machine-direction tear (MD tear) of greater than or equal to 5.0 gf, measured according to Elmendorf Tear ASTM D 1922 measured at 14 gsm; and
    an average machine-direction force at 10% elongation of greater than or equal to 16.0 Newtons, measured according to ASTM D 638 at a tensile speed of 20 inch/minute and measured at 14 gsm.

17. A film according to claim 1, wherein:
    the LLDPE polymer comprises a SCBD of less than 7.0° C. to 5.0° C.; and
    the film has:
      an average water vapor transmission rate (WVTR) of greater than or equal to 15,000 g/m$^2$/day to 17,000 g/m$^2$/day, measured according to ASTM D6701 measured at 14 gsm, 100% RH, and 38° C.,
      a hydrostatic pressure of greater than or equal to 120 cm water to 129 cm water, measured according to ISO 1420 measured at 14 gsm,
      an average machine-direction tear (MD tear) of greater than or equal to 5.0 gf to 7.0 gf, measured according to Elmendorf Tear ASTM D 1922 measured at 14 gsm, and
      an average machine-direction force at 10% elongation of greater than or equal to 16.0 Newtons to 18.0 Newtons, measured according to ASTM D 638 at a tensile speed of 20 inch/minute and measured at 14 gsm.

18. A film according to claim 1, wherein:
    the LLDPE polymer comprises a SCBD of less than 7.0° C. to 6.5° C.; and
    the film has:
      an average water vapor transmission rate (WVTR) of greater than or equal to 16,000 g/m$^2$/day to 16,750 g/m$^2$/day, measured according to ASTM D6701 measured at 14 gsm, 100% RH, and 38° C.,
      a hydrostatic pressure of greater than or equal to 123 cm water to 127 cm water, measured according to ISO 1420 measured at 14 gsm,
      an average machine-direction tear (MD tear) of greater than or equal to 5.0 gf to 5.6 gf, measured according to Elmendorf Tear ASTM D 1922 measured at 14 gsm, and an average machine-direction force at 10% elongation of greater than or equal to 16.0 Newtons to 16.4 Newtons, measured according to ASTM D 638 at a tensile speed of 20 inch/minute and measured at 14 gsm.

* * * * *